(12) United States Patent  (10) Patent No.: US 6,500,510 B1
Sanders et al.  (45) Date of Patent: Dec. 31, 2002

(54) MOLECULAR LEVEL OPTICAL INFORMATION STORAGE DEVICES

(75) Inventors: Patrick Sanders, Newport Beach, CA (US); Carlo Alberto Bignozzi, Ferrara (IT)

(73) Assignee: Molecular Storage Technologies, Inc., Newport Beach, CA (US)

( * ) Notice: Subject to any disclaimer, the term of this patent is extended or adjusted under 35 U.S.C. 154(b) by 0 days.

(21) Appl. No.: 09/544,767

(22) Filed: Apr. 7, 2000

Related U.S. Application Data

(60) Provisional application No. 60/163,547, filed on Nov. 4, 1999.

(51) Int. Cl.$^7$ .......................... B32B 3/02; G03C 1/492; G03C 1/76; G03C 5/00; G03C 1/00
(52) U.S. Cl. .................... 428/64.1; 428/64.2; 428/64.4; 430/270.16; 430/277.1; 430/343; 430/495.1
(58) Field of Search ................................ 428/64.1, 64.2, 428/64.4; 430/495.1, 343, 277.1, 270.16

(56) References Cited

U.S. PATENT DOCUMENTS

| | | |
|---|---|---|
| 4,605,607 A | 8/1986 | Nikles et al. |
| 4,663,084 A | 5/1987 | Shirai et al. |
| 4,684,537 A | 8/1987 | Graetzel et al. |
| 4,865,948 A | 9/1989 | Matsumoto et al. |
| 4,886,717 A | 12/1989 | Jinno et al. |
| 5,032,973 A | 7/1991 | Yoshimura |
| 5,124,067 A | 6/1992 | Iroh et al. |
| 5,167,996 A | 12/1992 | Kurisu et al. |
| 5,188,875 A | 2/1993 | Yamaoka et al. |
| 5,240,797 A | 8/1993 | Matsushima et al. |
| 5,242,558 A | 9/1993 | Matsushima et al. |
| 5,270,463 A | 12/1993 | Itoh et al. |
| 5,312,906 A | 5/1994 | Shimoda |
| 5,329,514 A | 7/1994 | Eguchi et al. |
| 5,330,542 A | 7/1994 | Maeda et al. |
| 5,350,843 A | 9/1994 | Itoh et al. |
| 5,389,419 A | 2/1995 | Maeda et al. |
| 5,395,678 A | 3/1995 | Matsushima et al. |
| 5,441,844 A | 8/1995 | Shimoda |
| 5,444,811 A | 8/1995 | Yoshimura et al. |
| 5,462,849 A | 10/1995 | Kuromoto et al. |
| 5,464,673 A | 11/1995 | Watabe et al. |
| 5,468,874 A | 11/1995 | Sugai et al. |
| 5,470,690 A | 11/1995 | Lewis et al. |
| 5,472,759 A | 12/1995 | Chen et al. |
| 5,478,701 A | 12/1995 | Jung |
| 5,480,749 A | 1/1996 | Green |
| 5,512,423 A | 4/1996 | Kitao et al. |
| 5,539,100 A | 7/1996 | Wasielewski et al. |
| 5,576,055 A | 11/1996 | Tagaya et al. |
| 5,586,109 A | 12/1996 | Inui et al. |
| 5,605,726 A | 2/1997 | Gibbons et al. |
| 5,623,040 A | 4/1997 | Fischer et al. |
| 5,623,476 A | 4/1997 | Eguchi et al. |
| 5,633,106 A | 5/1997 | Aihira et al. |
| 5,638,103 A | 6/1997 | Obata et al. |

(List continued on next page.)

OTHER PUBLICATIONS

A. C. Lees, B. Evrard, T. E. Keyes, G. J. Vos, C. J. Kleverlaan, M. Alebbi, C. A. Bignozzi Eur. J. Inorg. Chem. 2309 (1999).

(List continued on next page.)

Primary Examiner—Cynthia H. Kelly
Assistant Examiner—L. Ferguson
(74) Attorney, Agent, or Firm—Knobbe, Martens, Olson & Bear LLP

(57) ABSTRACT

The present invention relates to use of transition metal complexes in photochromic devices, to the production of optical information storage devices based on a polymeric matrix and on metal oxides with adsorbed transition metal complexes, to the production of photochromic materials constituted by a film of metal oxide with adsorbed two different type of molecular systems, one acting as a charge transfer sensitizer and the second as an electron acceptor.

17 Claims, 16 Drawing Sheets

Spectral changes observed on a transparent titanium dioxide film with adsorbed the Ru(dcb)$_2$(bpy) and the binuclear K[ trans-HOOCpyRu$^{II}$(NH$_3$)$_4$-NCRu$^{II}$(CN)$_5$] complex, irradiated with a 150W Xe lamp. The absorption was carried out from a ca 2x 10$^{-4}$M methanol solution of the two species.

U.S. PATENT DOCUMENTS

| | | |
|---|---|---|
| 5,639,588 A | 6/1997 | Huh |
| 5,645,758 A | 7/1997 | Kawasumi et al. |
| 5,648,135 A | 7/1997 | Watanabe et al. |
| 5,652,280 A | 7/1997 | Kutal |
| 5,658,707 A | 8/1997 | Takuma et al. |
| 5,674,583 A | 10/1997 | Nakayama et al. |
| 5,676,854 A | 10/1997 | Inui et al. |
| 5,679,430 A | 10/1997 | Shinkai et al. |
| 5,684,622 A | 11/1997 | Charra et al. |
| 5,693,451 A | 12/1997 | Sommer et al. |
| 5,714,304 A | 2/1998 | Gibbons et al. |
| 5,776,656 A | 7/1998 | Shinkai et al. |
| 5,811,217 A | 9/1998 | Akihara et al. |
| 5,815,484 A | 9/1998 | Smith et al. |
| 5,824,450 A | 10/1998 | Abe |
| 5,847,141 A | 12/1998 | Malkin |
| 5,855,979 A | 1/1999 | Umehara et al. |
| 5,863,703 A | 1/1999 | Tomura et al. |
| 5,936,878 A | 8/1999 | Arsenov et al. |
| 5,939,163 A | 8/1999 | Ueno et al. |
| 5,945,252 A | 8/1999 | Sokoluk et al. |
| 5,949,751 A | 9/1999 | Horikawa et al. |
| 5,958,650 A | 9/1999 | Wolleb et al. |
| 5,962,657 A | 10/1999 | Wolleb et al. |
| 5,977,241 A | 11/1999 | Koloski et al. |

OTHER PUBLICATIONS

C. A. Bignozzi, J. R. Schoonover, F. Scandola Progr. Inorg. Chem. 44, 1–95 (1997).
C. A. Bignozzi, R. Argazzi, C. J. Kleverlaan Chem. Soc. Rev. 29, 87 (2000).
C. G. Garcia, N. Y. Marakami Iha, R. Argazzi, C. A. Bignozzi J. Photochem. Photobiol. A: Chemistry 115, 239 (1998).
H. Huesmann, C. A. Bignozzi, M. T. Indelli, L. Pavanin, M. A. Rampi, D. Mobius *Thin Solid Films*. 284, 62 (1996).
Hanazawa, M; Sumiya, R.; Horikawa, Y.; Irie, M *J. Chem. Soc. Chem. Commun.* 206 (1992).
Irie, M.; Mohri, M. *J. Org. Chem.* 53, 803 (1988).
J. A. Moss, R. Argazzi, C. A. Bignozzi, G. J. Meyer *Inorg. Chem.* 36, 762 (1997).
M. K. Nazeeruddin, A. Kay, I. Rodicio, R. Humphry–Baker, E. Muller, P. Liska, N. Vlachopoulos, M. Gratzel J. Am. Chem. Soc. 115, 6382 (1993).
M. T. Indelli, C. A. Bignozzi, F. Scandola, J. P. Collin *Inorg. Chem.* 37, 6084 (1998).
R. Argazzi, C. A. Bignozzi, T. A. Heimer, P. Castellano, G. J. Meyer. *Inorg. Chem.* 33, 5741 (1994).
R. Argazzi, C. A. Bignozzi, G. Hasselmann and G. J. Meyer, *Inorg. Chem.* 37, 4533 (1998).
R. Argazzi, C. A. Bignozzi, G. M. Hasselmann and G. J. Meyer *Inorg. Chem.* 37, 4533 (1998).
R. Argazzi, C.A. Bignozzi, T. A. Heimer, G. J. Meyer *Inorg. Chem.* 36, 2 (1997).
Saika, T; Irie, M; Shimidzu, T; J. *Chem. Soc. Chem. Commun.* 2123 (1994).
T. A. Heimer, S. T. D'Arcangelis, F. Farzad, J. M. Stipkala and G. J. Meyer *Inorg. Chem.* 35, 5319 (1996).
T. J. Meyer, G. J. Meyer, B. W. Pfennig, J. R. Schoonover, C. J. Timpson, J. F. Wall, C. Kobusch, X. Chen, B. M. Peek, C. G. Wall, W. Ou, B. W. Erickson, C. A. Bignozzi *Inorg. Chem.* 33, 3952 (1994).
T. J. Meyer, *Pure and Applied Chemistry* 58, 1193 (1986).
J. Moss, J, Stipkala, J. Yang, C. Bignozzi, G. Meyer, T. Meyer, X. Wen, R. Linton; *Chem. Mater* 10, 1748–1750 (1998).
M. Irie; *Am. Chem. Society v. 100*, No. 5; May 2000: Photochromoism: Memories and Switches—Introduction.
M. Irie: *Chem. Rev. v. 100* (1685–1716): "Diarylethenes for Memories and Switches"; Apr. 2000.
Y. Yokoyama; *Chem. Rev. V. 100*; (1717–1739); "Fulgides for Memories and Switches"; Mar. 2000.
G. Berkovic, V. Krongauz, Victor Weiss; *Chem. Rev. v. 100* (1741–1753); "Spiropyrans and Spirooxazines for Memories and Switches"; Mar. 2000.
N. Hampp; *Chem. Rev., v. 100* (1755–1766); "Bacteriorhodopsin as a Photochromic Retinal Protein for Optical Memories"; Apr. 2000.
S. Kawata, Y. Kawata; *Chem. Rev. v. 100* (1777–1788); Three–Dimensional Optical Data Storage Using Photochromic Materials.

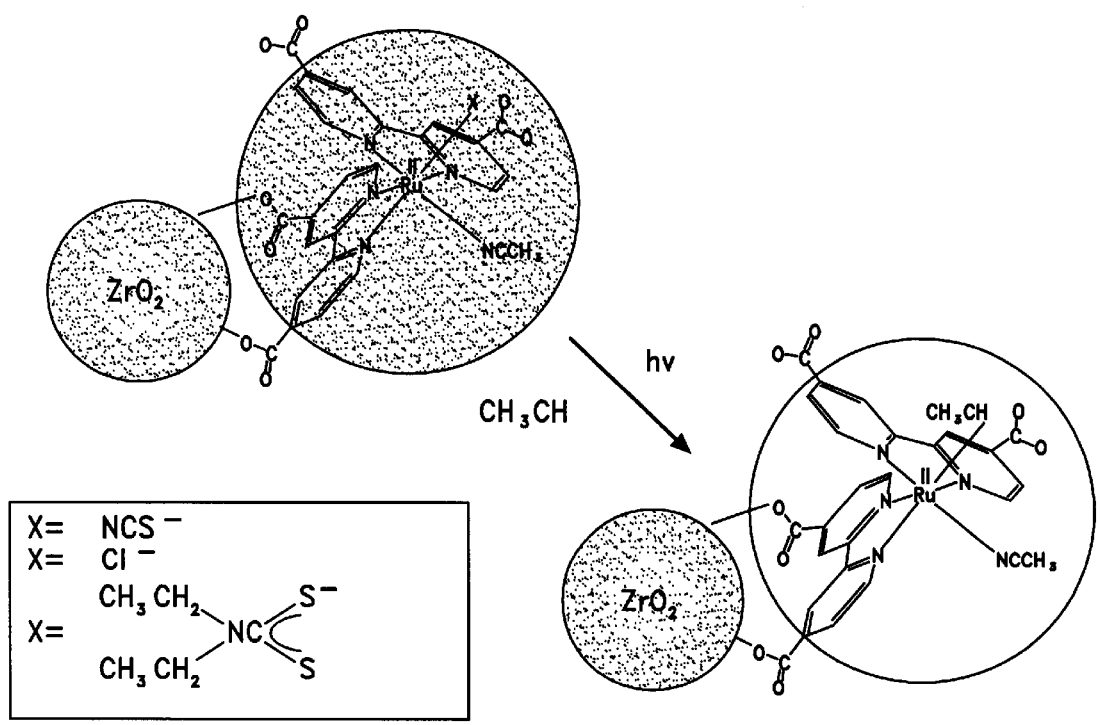
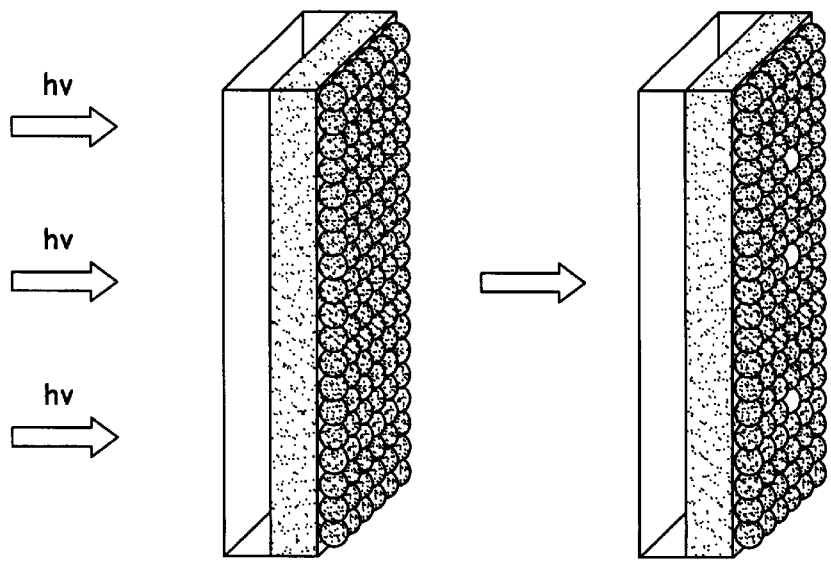
Fig. 5

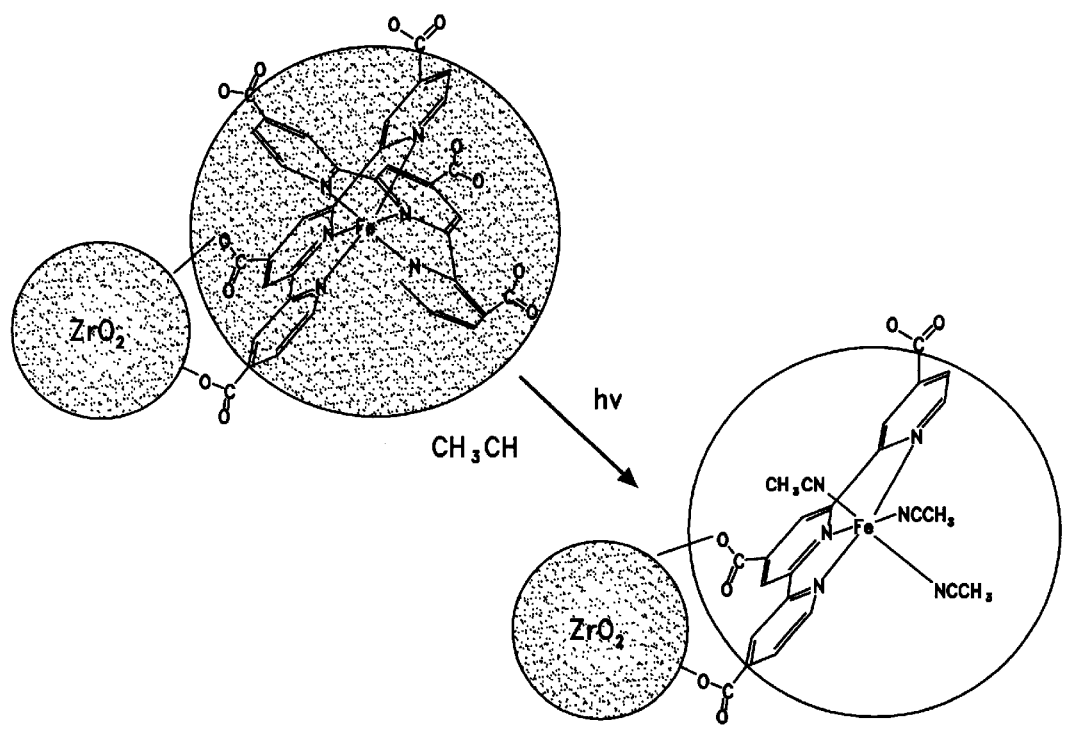
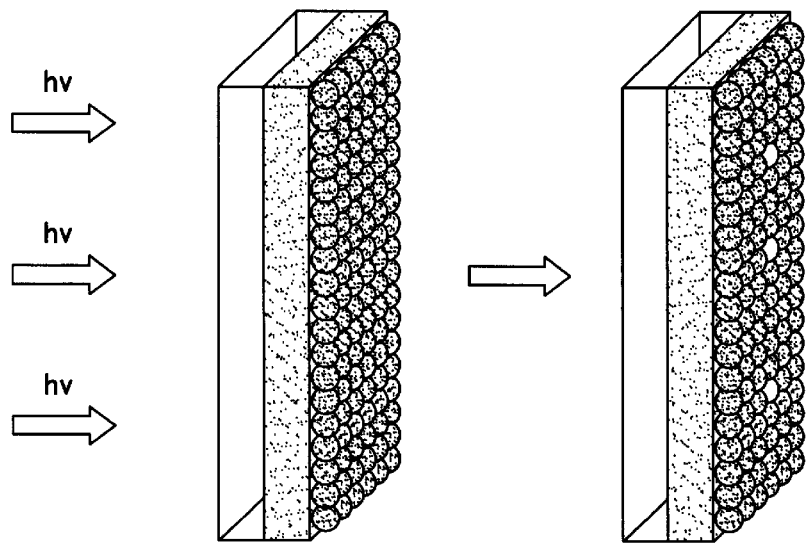
Fig. 6

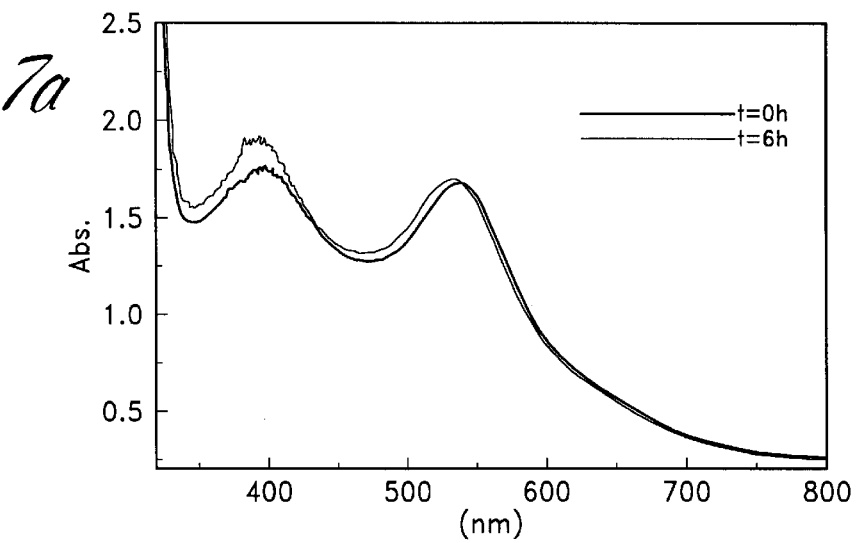
Photolysis of Ru(dcH$_2$b)$_2$(COO)$_2$ on ZrO$_2$/CH$_3$CN (λ>500 nm)
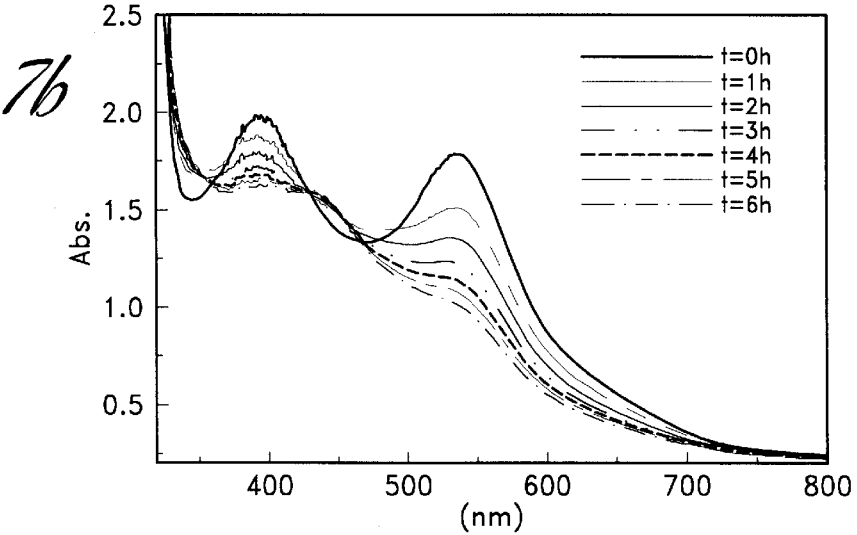
Photolysis of Ru(dcH$_2$b)$_2$(COO)$_2$ on ZrO$_2$/CH$_3$CN (λ>400 nm)
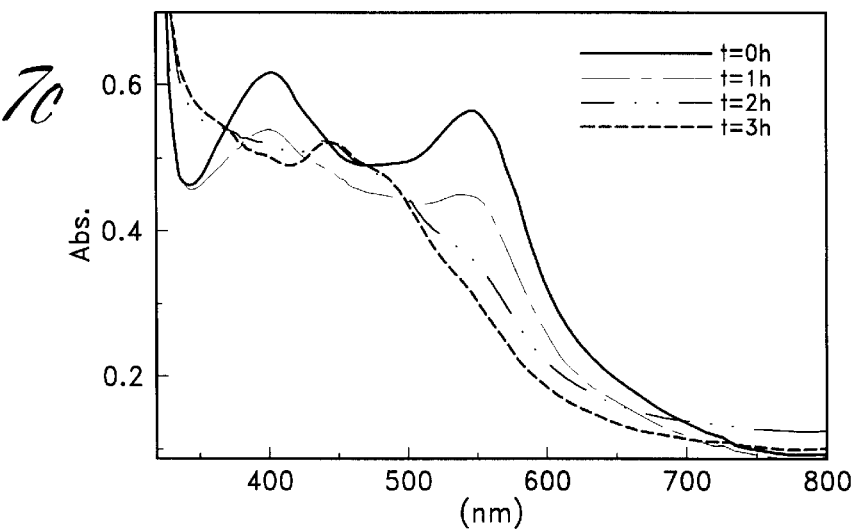

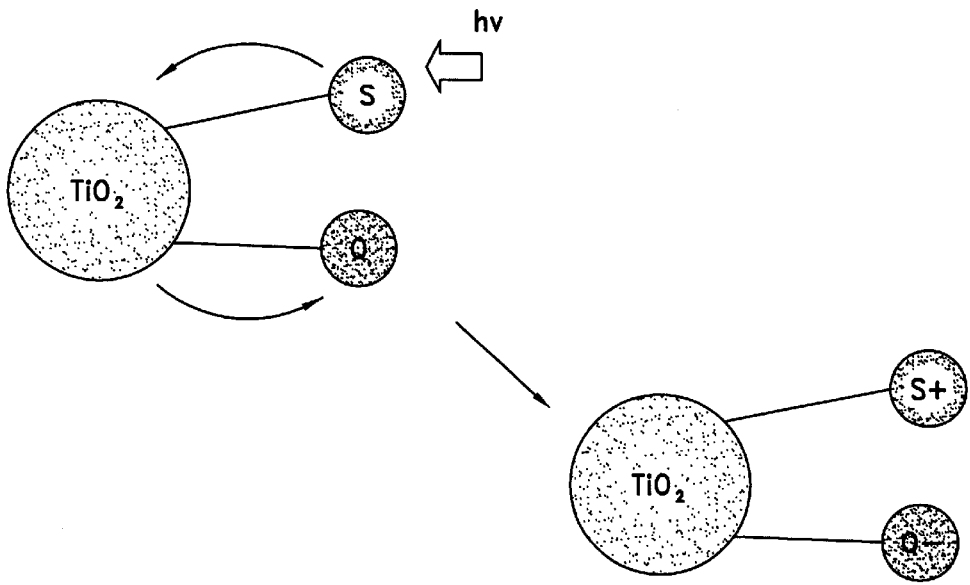
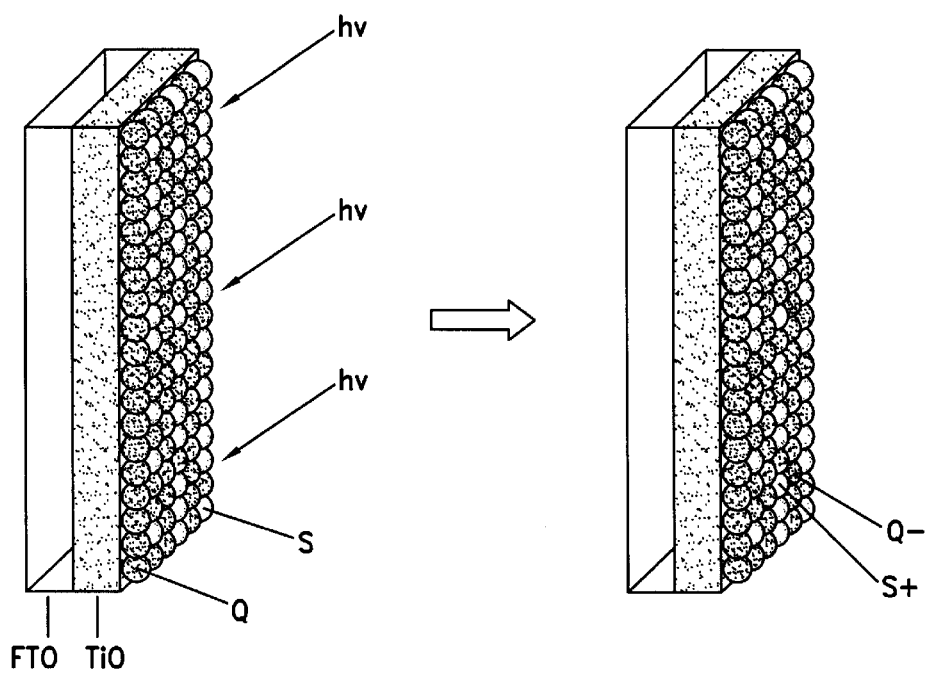
Fig. 15

Spectral changes observed on a transparent titanium dioxide film with adsorbed the Ru(dcb)$_2$(bpy) and the binuclear K[ trans-HOOCpyRu$^{III}$(NH$_3$)$_4$-NCRu$^{II}$(CN)$_5$] complex, irradiated with a 150W Xe lamp. The absorption was carried out from a ca 2x 10$^{-4}$M methanol solution of the two species.

MOLECULAR LEVEL OPTICAL INFORMATION STORAGE DEVICES

RELATED APPLICATIONS

This application claims priority from provisional application Ser. No. 60/163,547 filed Nov. 4, 1999.

FIELD OF THE INVENTION

The present invention relates to the use of transition metal complexes as means to store information in optical information storage devices.

BACKGROUND OF THE INVENTION

Great interest is currently devoted to bistable molecular or supramolecular species presenting two forms whose inter-conversion can be modulated by an external stimulus. (Lehn J.-M., Supramolecular Chemistry, Concepts and Perspectives; VCH: Weiheim, (1995)). The design of such molecular-level switching devices is directly linked to the chemistry of signal generation, transfer, conversion, storage and detection.

Typical bistable species include photochromic compounds, which are molecules that can be interconverted between two forms exhibiting different visible light absorption (i.e., color). Photochromism occurs in a wide variety of materials, including both inorganic and organic compounds. Illustrative of the classes of organic compounds are anils, disulfoxides, hydrazones, oxazones, semicarbazones, stilbene derivatives, succinic anhydrides, camphor derivatives, syndromes and spiro compounds. A rather large variety of inorganic compounds show photochromism, including metal oxides, alkaline earth metal sulfides, titanates, mercury compounds, and copper compounds. These materials have been known for a long time and a description of these systems can be found in the literature. ("Photochromism" Glenn H. Brown Ed., Volume III, John Wiley & Sons, Publisher, 1971).

Because they interconvert between two different colors, photochromic compounds have the capability to function as a binary information storage system. One color represents 0, and the second color 1, to encode information in digital format. Molecular level optical memory devices incorporating these molecules should offer the possibility of packing an extremely large quantity of information into a small space, which can be read through a binary code with a resolution of the order of nanometers.

However, previously known photochromic compounds are unsuitable for long term information storage applications. Most photochromic compounds change their color by photoexcitation and revert, more or less slowly, to their initial state when kept in the dark. Compounds exhibiting this behavior are useless for information storage since the written information is spontaneously erased after a relatively short time.

Other prior photochromic compounds are more stable, but tend to undergo reversible photoisomerization. (Irie, M.; Mohri, M. *J. Org. Chem.* 53, 803 (1988); Hanazawa, M; Sumiya, R.; Horikawa, Y.; Irie, M; *J. Chem. Soc. Chem. Commun.* 206 (1992); Saika, T; Irie, M; Shimidzu, T; *J. Chem. Soc. Chem. Commun.* 2123 (1994)). Such compounds can be used for information storage optoelectronic devices, but do not provide a good long term storage solution, because the light used for reading the written data causes the back-conversion of the sampled molecules, and thus the gradual loss of information. Several attempts have been made to overcome this difficulty, including the use of photochemically inactive infrared light to read the status of the system.

Consequently, there is a need for improved photochromic molecules which will provide for stable, long-term storage of information.

SUMMARY OF THE INVENTION

The present invention overcomes the shortcomings of the prior art photochromic molecules by providing reactive species which undergo stable and irreversible color changes under controlled conditions.

In one aspect of the invention, a binary data recording medium is provided which includes a substrate and a recording layer on the substrate. The recording layer includes an organometallic transition metal complex which absorbs at a first wavelength. When the complex is subject to a light-induced excited state resulting in a reaction product in the recording layer, it absorbs light having a second, different wavelength. The light absorption of the first wavelength is assigned a first value, and light absorption of the second wavelength is assigned a second value, the first and second values corresponding to binary code.

The transition metal complex in one aspect of the present invention includes at least one of the following formulas: $[M(N—N)_2L_2]^n$, $[M(N—N)L_4]^n$, $[M(N—N—N)L_3]^n$, and $[M(N—N—N)_2]^n$. M is a transition metal; N—N is a chromophoric polypyridine ligand incorporating from one to two substituents selected from the group consisting of —COOH, —B(OH)$_2$, —PO$_3$H$_2$, and —R—PO$_3$H$_2$, where R is a saturated or aromatic hydrocarbon group; N—N—N is a chromophoric terpyridyl ligand incorporating from one to three substituents selected from the group consisting of —COOH, —B(OH)$_2$, —PO$_3$H$_2$, —R—PO$_3$H$_2$, and phenyl, where the phenyl incorporates one or more substituents selected from the group consisting of —COOH, —B(OH)$_2$, —PO$_3$H$_2$, —R—PO$_3$H$_2$, where R is a saturated or aromatic hydrocarbon group; and L is a nonchromophoric monodentate or polydentate ancillary ligand.

In other aspects of this particular embodiment, M is selected from cobalt, nickel, copper, iridium, palladium, platinum, rhenium, osmium, iron, ruthenium and rhodium; N—N is selected from substituted and unsubstituted 2,2'-bipyridyl, substituted and unsubstituted 1,10-phenanthroline and substituted or unsubstituted 2,2'-biquinoline; N—N—N is substituted by a phenyl, and where the phenyl incorporates a substituent in a para position; and L is selected from NC—(CH$_2$)$_2$—CN, NC—(CH$_2$)$_3$—CN, NC—(CH$_2$)$_4$—CN, halide, NCS$^-$, N$_3^-$, —CH$_3^-$, H$^-$, oxalate, CO, CN$^-$, NO, H$_2$O, OH$^-$, NH$_3$, triazole, pyridine, pyrazine, 4,4'-bipyridine, 4,4'-bipyridylethane, 4,4'-bipyridylethylene, 4-cyanopyridine, dicyanobenzene, diethylenediamine, NO$_2^-$, and acetylacetone; or L may include a coordinating solvent selected from the group consisting of acetylacetone, methanol, acetonitrile, acetone, tetrahydrofuran, ethanol, dimethylformamide, and dimethylsulfoxide. The substrate may be amorphous, nanocrystalline or a semiconductor.

In a further aspect of the present invention, the transition metal complex includes at least one of the following formulas: $[M(N—N)_2(Y\text{-nor-}Y)(L)]^n$, $[M(N—N)_2(Y\text{-nor-}Y)_2]^n$, $[M(N—N)_2(X)(Y\text{-nor-}Y)M(N—N)_2(L)]^n$, $[M(N—N—N)(Y\text{-nor-}Y)(L)_2]^n$, $[M(N—N—N)_2(Y\text{-nor-}Y)_2(L)]^n$, and $[M(N—N—N)_2(L)_2(Y\text{-nor-}Y)M(N—N—N)_2(L)_2]^n$. Y is selected from cyano, pyridine, and pyridine methylene and nor is norbomadiene; M is a transition metal; N—N is a substituted or unsubstituted chromophoric polypyridine ligand; N—N—N is a substituted or unsubstituted chromophoric terpyridyl ligand; L is a nonchromophoric monodentate or polydentate ancillary ligand; and X is a ligand selected from the group consisting of polyaza macrocyclic group and polythio macrocyclic group.

In a further aspect of the present invention, the transition metal complex includes at least one of the following formulas: [trans-HOOCpyRu$^{II}$(X)$_4$—NC-nor-CN]$^{2+}$, ([trans-HOOCpyRu$^{II}$(X)$_4$—NC]$_2$-nor)$^{4+}$, [trans-CH$_3$—OOCpyRu$^{II}$(X)$_4$—NC-nor-CN]$^{2+}$, ([trans-CH$_3$—OOCpyRu$^{II}$(X)$_4$—NC]$_2$-nor)$^{4+}$, [trans-CH$_3$CH$_2$—OOCpyRu$^{II}$(X)$_4$—NC-nor-CN]$^{2+}$, and ([trans-CH$_3$CH$_2$—OOCpyRu$^{II}$(X)$_4$—NC]$_2$-nor)$^{4+}$. HOOCpy is the isonicotinic acid; NC-nor-CN is the dicyanonorbornadiene ligand; X is selected from polyaza macrocyclic group, polythio macrocyclic group, and NH$_3$; and trans is the configuration of the Ru center.

In a further aspect of the present invention, the transition metal complex includes a molecular sensitizer. The molecular sensitizer has a photoabsorption spectrum and is capable of injecting an electron into an empty conduction band of the substrate upon absorption of visible light to form oxidized molecular sensitizer having a photoabsorption spectrum different from the unoxidized molecular sensitizer. An electron acceptor is present which has a photoabsorption spectrum and is capable of accepting the electron to form a reduced electron acceptor having a different photoabsorption spectrum. A separation of charge between the oxidized molecular sensitizer and reduced electron acceptor is maintained upon continued irradiation by visible light.

The transition metal in this aspect of the invention is represented by at least one of the following formulas: [M(N—N)$_2$L$_2$]$^n$, [M(N—N)L$_4$]$^n$, [M(N—N—N)L$_3$]$^n$, and [M(N—N—N)$_2$]$^n$. M is a transition metal; N—N is a chromophoric polypyridine ligand and incorporating from one to two substituents selected from the group consisting of —COOH, —B(OH)$_2$, —PO$_3$H$_2$, and —R—PO$_3$H$_2$, where R is a saturated or aromatic hydrocarbon group; N—N—N is a chromophoric terpyridyl ligand incorporating from one to three substituents selected from the group consisting of —COOH, —B(OH)$_2$, —PO$_3$H$_2$, —R—PO$_3$H$_2$, and phenyl, where the phenyl incorporates one or more substituents selected from the group consisting of —COOH, —B(OH)$_2$, —PO$_3$H$_2$, —R—PO$_3$H$_2$, where R is a saturated or aromatic hydrocarbon group; and L is a nonchromophoric monodentate or polydentate ancillary ligand.

In this particular aspect of the invention, the electron acceptor is represented by one of the formulas:

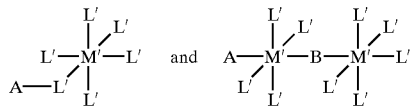

where A is pyridine substituted in the para position by a moiety selected from the group consisting of —COOH, —B(OH)$_2$, PO$_3$H$_2$, and —R—PO$_3$H$_2$, where R is a hydrocarbon linking group; B is a bridging ligand; L', which can be the same or different, is a ligand selected from the group consisting of NC—(CH$_2$)$_2$—CN, NC—(CH$_2$)$_3$—CN, NC—(CH$_2$)$_4$—CN, halide, NCS$^-$, oxalate, CO, CN$^-$, NO, pyridine, 4-cyanopyridine, dicyanobenzene, H$_2$O, OH$^-$, NH$_3$, diethylenediamine, NO$_2$$^-$, 2,2'-bipyridyl unsubstituted or substituted by one or more methyl groups, and 1,10-phenanthroline unsubstituted or substituted by one or more methyl groups; and M', which can be the same or different, is a transition metal capable of undergoing a reversible change of oxidation state. The medium may additionally include a thin transparent polymeric film situated atop the recording layer.

In yet another aspect of the present invention, a method for storing data in optically-readable form is provided. The method includes providing a photochromic metal complex on a substrate, the photochromic complex absorbing visible light of a first wavelength; immersing the substrate and attached photochromic metal complex in a liquid having a coordinating compound; irradiating the attached photochromic metal complex at selected regions to induce a photoreaction between the metal complex and the coordinating compound, the resulting reaction producing a reaction product on the substrate which absorbs light of a second wavelength, the first and second wavelengths being selected to correspond to binary code for information storage; and removing excess coordinating compound to render the reaction irreversible.

In yet another aspect of the present invention, a method for retrieving data stored in optically-readable form is provided. The method includes providing an optical information storage medium including a metal complex on a substrate, where the metal complex exists in an initial state and a reacted state, the initial state having an absorption or emission spectrum different from that of the reacted state, where regions of metal complex in the initial state correspond to a binary value of 1 or 0 and where regions of the metal complex in the reacted state correspond to the opposite binary value; exposing the medium to a beam of light, where the light has a wavelength which is selectively adsorbed by either the metal complex in the initial state or the metal complex in the reacted state; and measuring the intensity of the beam of light after exposure to the medium, where the intensity of the transmitted beam indicates whether the beam has been exposed to a region of metal complex in the initial state or a region of metal complex in the reacted state, thereby retrieving a binary value stored in the recording media.

In yet another aspect of the present invention, a method for storing data in optically-readable form is provided. The method includes providing an optical information recording medium including a substrate component supporting regions of a nonisomerized metal complex, where the nonisomerized metal complex region has a first absorption spectrum corresponding to a binary value of 1 or 0; and exposing the nonisomerized metal complex region to electromagnetic radiation in the UV to visible light range, thereby causing the nonisomerized metal complex to convert to an isomer metal complex region, the isomer metal complex region having a second absorption spectrum which differs from the first absorption spectrum, the second absorption spectrum corresponding to the opposite binary value. More specifically, the substrate may be selected from tungsten trioxide, titanium dioxide, zinc dioxide, and tin dioxide. The substrate may also be nanocrystalline or include particles in colloidal form, the particles having an average diameter ranging from about 10 nm to about 50 nm.

In a further aspect of the present invention, a method for storing data in optically-readable form is provided. The method includes providing an unoxidized molecular sensitizer and an unreduced electron acceptor attached to a wide band gap semiconductor substrate, the unoxidized molecular sensitizer absorbing visible light of a first wavelength, the unreduced electron acceptor absorbing visible light of a second wavelength; and irradiating the unoxidized molecular sensitizer at selected regions to induce injection of an electron into an empty conduction band of the substrate followed by acceptance of the electron by the electron acceptor, thereby forming an oxidized molecular sensitizer, the oxidized molecular sensitizer absorbing light of a third wavelength, and thereby forming a reduced electron acceptor, the reduced electron acceptor absorbing light of a fourth wavelength, a combination of the third and fourth wavelengths being selected to correspond to a binary code for information storage.

In a further aspect of the present invention, a method for retrieving data stored in optically-readable form is provided. The method includes providing an optical information storage medium including a molecular sensitizer and electron acceptor adsorbed on a wide band gap semiconductor substrate, where in one or more regions of the medium is the molecular sensitizer is oxidized and the electron acceptor is reduced, where the oxidized molecular sensitizer has an absorption or emission spectrum different from that of the molecular sensitizer in an unoxidized form, where the reduced electron acceptor has an absorption or emission spectrum different from that of the electron acceptor in the unreduced form, where regions of the oxidized molecular sensitizer and reduced electron acceptor correspond to a binary value of 1 or 0 and where regions of the molecular sensitizer in the unoxidized state and electron acceptor in the unreduced state correspond to the opposite binary value.

In this particular aspect of the present invention, the molecular sensitizer is represented by one of the formulas: $[M(N-N)_2L_2]^n$, $[M(N-N)L_4]^n$, $[M(N-N-N)L_3]^n$, and $[M(N-N-N)_2]^n$. M is a transition metal having an oxidation state; N—N is a chromophoric polypyridine ligand having a charge and incorporating from one to two substituents selected from the group consisting of —COOH, —B(OH)$_2$, —PO$_3$H$_2$, and —R—PO$_3$H$_2$, where R is a saturated or aromatic hydrocarbon group; N—N—N is a chromophoric terpyridyl ligand having a charge and incorporating from one to three substituents selected from the group consisting of —COOH, —B(OH)$_2$, —PO$_3$H$_2$, —R—PO$_3$H$_2$, and phenyl, where the phenyl incorporates one or more substituents selected from the group consisting of —COOH, —B(OH)$_2$, —PO$_3$H$_2$, —R—PO$_3$H$_2$, where R is a saturated or aromatic hydrocarbon group; L is a non-chromophoric monodentate or polydentate ancillary ligand having a charge; and n is the total charge including an algebraic sum of the oxidation state of M and the charge of the ligands. The method further includes reflecting a beam of light off the medium, where the light has a wavelength which is selectively adsorbed by either the oxidized molecular sensitizer or the molecular sensitizer in the unoxidized state; and measuring the intensity of the beam of light after it is reflected by the medium, where the intensity of the reflected beam indicates whether the beam has passed through a region of oxidized molecular sensitizer and reduced electron acceptor or a region of molecular sensitizer in the unoxidized state and electron acceptor in the unreduced state, thereby retrieving a binary value stored in the recording media.

In yet another aspect of the present invention, a metal complex is provided that is represented by one of the formulas: $[(4,4'-HPO_3CH_2)_2bpyRu(CN)_4]^{4-}$, $[(4,4'-HPO_3)_2bpyRu(CN)_4]^{4-}$, $(4,4'-HPO_3CH_2)_2(bpy)Re(CO)_3(X)$, $[(dcbH_2)Ru(CN)_4]^{4-}$, and $(4,4'-HPO_3)_2(bpy)Re(CO)_3(X)$; where X is selected from CN$^-$, NCS$^-$, NC—(CH$_2$)$_2$—CN, NC—(CH$_2$)$_3$—CN, NC—(CH$_2$)$_4$—CN, halide, CO, NO, pyridine, 4-cyanopyridine, dicyanobenzene, H$_2$O, NH$_3$, and NO$_2^-$.

In a further aspect of the present invention, an optical information recording medium including a recording layer and a substrate is provided. The substrate includes a wide band gap semiconductor, where the recording layer includes an electron acceptor and a molecular sensitizer, where the molecular sensitizer represented by one of the formulas: $[(4,4'-HPO_3CH_2)_2bpyRu(CN)_4]^{4-}$, $[(4,4'-HPO_3)_2bpyRu(CN)_4]^{4-}$, $(4,4'-HPO_3CH_2)_2(bpy)Re(CO)_3(X)$, $[(dcbH_2)Ru(CN)_4]^{4-}$, and $(4,4'-HPO_3)_2(bpy)Re(CO)_3(X)$. X is selected from CN$^-$, NCS$^-$, NC—(CH$_2$)$_2$—CN, NC—(CH$_2$)$_3$—CN, NC—(CH$_2$)$_4$—CN, halide, CO, NO, pyridine, 4-cyanopyridine, dicyanobenzene, H$_2$O, NH$_3$, and NO$_2^-$. The molecular sensitizer has a photoabsorption spectrum and is capable of injecting an electron into an empty conduction band of the substrate upon absorption of visible light to form oxidized molecular sensitizer having a different photoabsorption spectrum, where the electron acceptor has a photoabsorption spectrum and is capable of accepting the electron to form a reduced electron acceptor having a different photoabsorption spectrum, and where a separation of charge between the oxidized molecular sensitizer and reduced electron acceptor is maintained upon continued irradiation by visible light.

In this particular aspect of the invention, the electron acceptor is represented by one of the formulas:

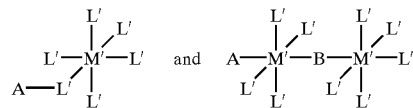

where A is pyridine substituted in the para position by a moiety selected from the group consisting of —COOH, —B(OH)$_2$, PO$_3$H$_2$, and —R—PO$_3$H$_2$, where R is a hydrocarbon linking group; B is a bridging ligand; L', which can be the same or different, is a ligand selected from the group consisting of NC—(CH$_2$)$_2$—CN, NC—(CH$_2$)$_3$—CN, NC—(CH$_2$)$_4$—CN, halide, NCS$^-$, oxalate, CO, CN$^-$, NO, pyridine, 4-cyanopyridine, dicyanobenzene, H$_2$O, OH$^-$, NH$_3$, diethylenediamine, NO$_2^-$, 2,2'-bipyridyl unsubstituted or substituted by one or more methyl groups, and 1,10-phenanthroline unsubstituted or substituted by one or more methyl groups; and M', which can be the same or different, is a transition metal capable of undergoing a reversible change of oxidation state. The medium may additionally including a thin transparent polymeric film, where the film is situated atop the recording layer.

BRIEF DESCRIPTION OF THE DRAWINGS

FIG. 5 generally illustrates the functioning of a Type I device involving the photoreaction of a Ru(dcH$_2$b)$_2$(L)$_2$ complex in the presence of acetonitrile.

FIG. 6 generally illustrates the functioning of a Type I device involving the photoreaction of the [Fe(trpy)(COOH)$_3$](ClO$_4$)$_2$ complex in the presence of acetonitrile.

FIG. 7a shows the initial spectrum of Ru(dcH$_2$b)$_2$(COO)$_2$ on ZrO$_2$/Ar, and the spectrum after photolysis at wavelengths greater than 500 nm for 6 hours.

FIG. 7b shows the initial spectrum of Ru(dcH$_2$b)$_2$(COO)$_2$ on ZrO$_2$/CH$_3$CN, and the spectrum after photolysis at wavelengths greater than 500 nm for 1, 2, 3, 4, 5, and 6 hours.

FIG. 7c shows the initial spectrum of Ru(dcH$_2$b)$_2$(COO)$_2$ on ZrO$_2$/CH$_3$CN, and the spectrum after photolysis at wavelengths greater than 400 nm for 15, 30 and 45 minutes.

FIG. 15 generally illustrates the functioning of a Type III device comprising a molecular sensitizer and electron acceptor adsorbed on a titanium dioxide substrate.

DETAILED DESCRIPTION OF THE PREFERRED EMBODIMENT

Figure 1A:
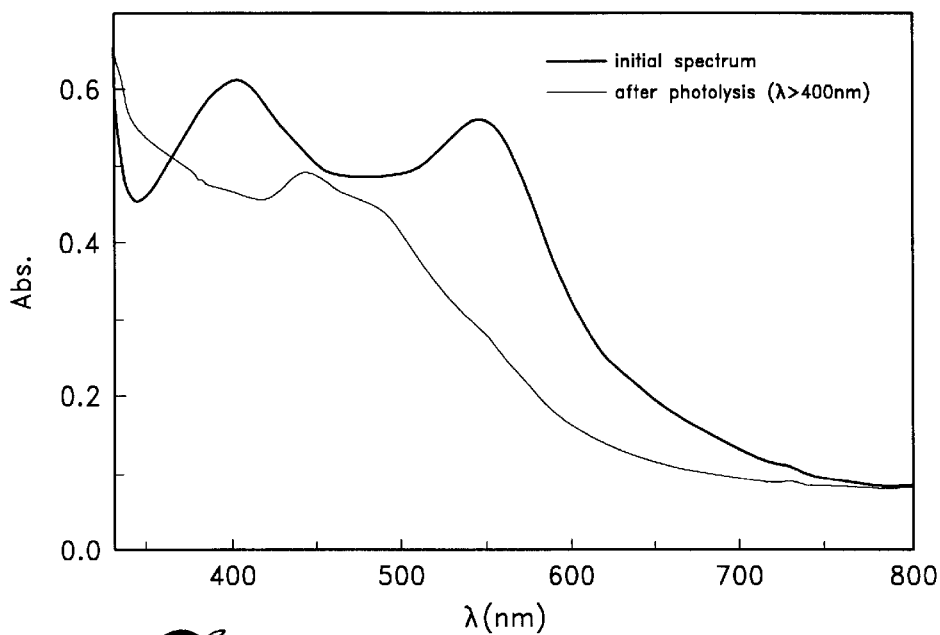
FIG. 1a shows the initial spectrum of Ru(dcH$_2$b)$_2$(COO)$_2$ on ZrO$_2$/CH$_3$CN, and the spectrum after photolysis at wavelengths greater than 400 nm.
Figure 1B:
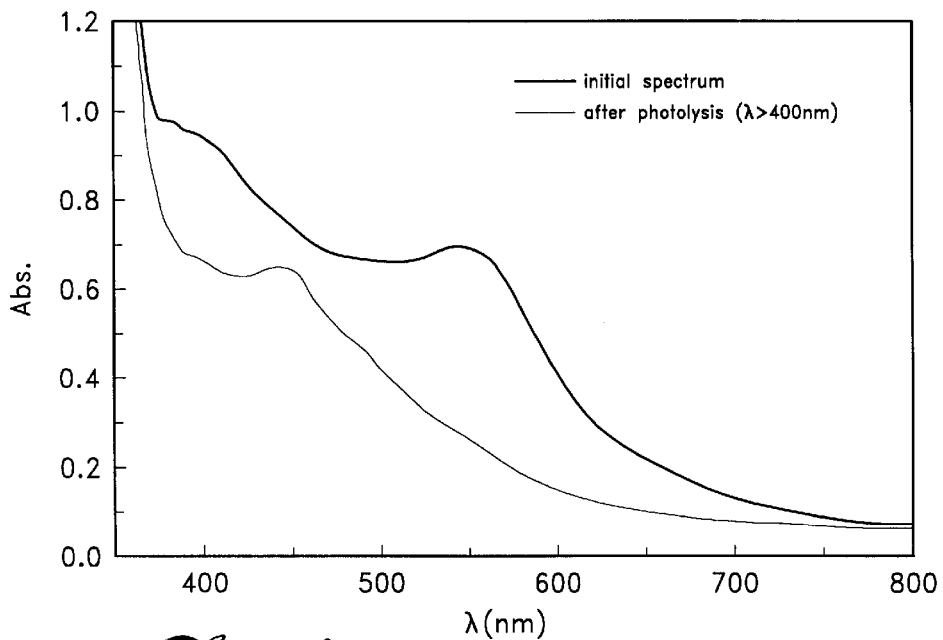
FIG. 1b shows the initial spectrum of Ru(dcH$_2$b)$_2$(COO)$_2$ on TiO$_2$/CH$_3$CN, and the spectrum after photolysis at wavelengths greater than 400 nm.
Figure 2A:
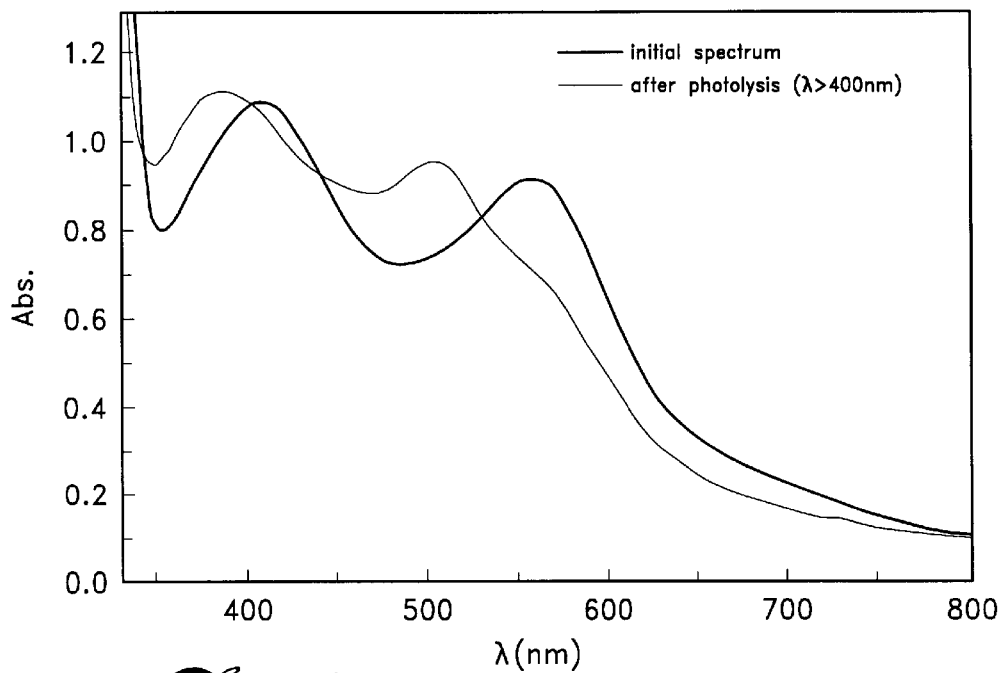
FIG. 2a shows the initial spectrum of Ru(dcH$_2$b)$_2$(Cl)$_2$ on ZrO$_2$/CH$_3$CN, and the spectrum after photolysis at wavelengths greater than 400 nm.
Figure 2B:
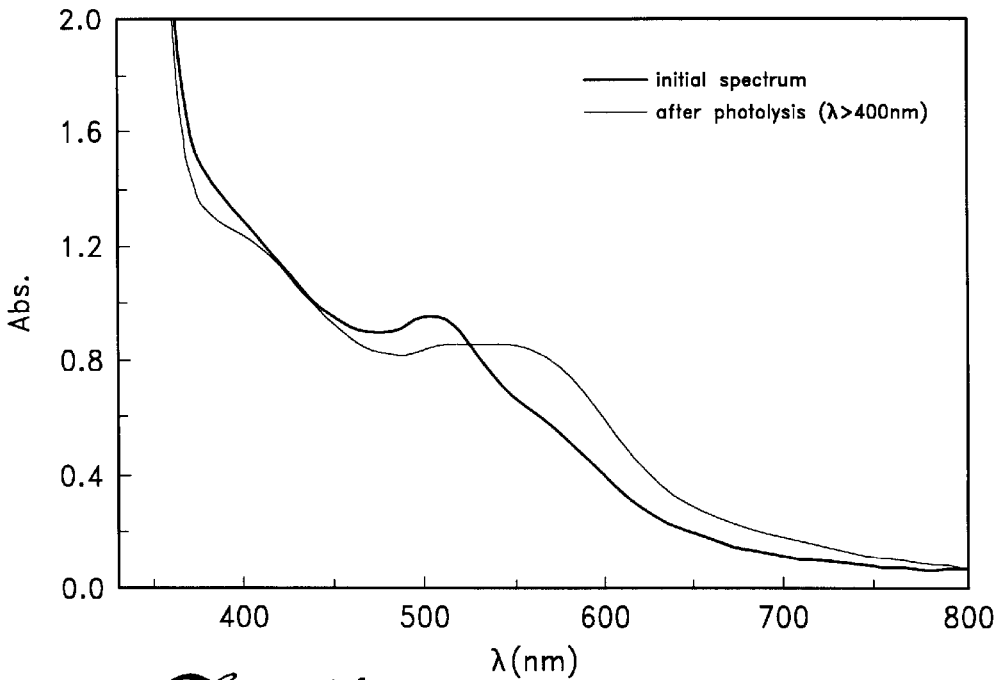
FIG. 2b shows the initial spectrum of Ru(dcH$_2$b)$_2$(Cl)$_2$ on TiO$_2$/CH$_3$CN, and the spectrum after photolysis at wavelengths greater than 400 nm.
Figure 3A:
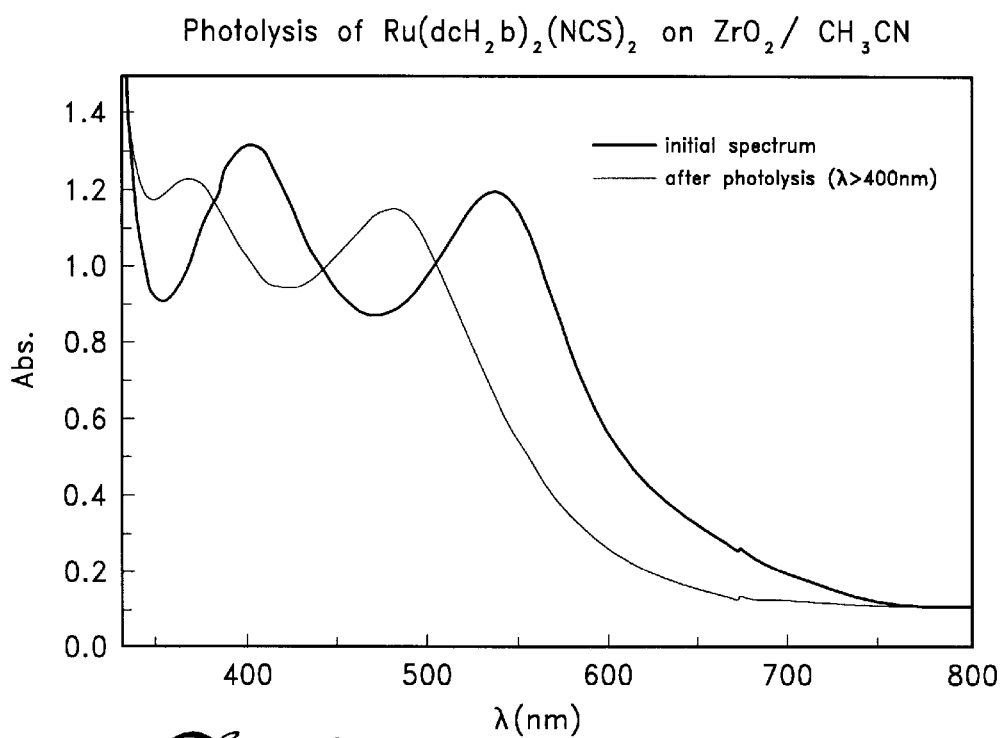
FIG. 3a shows the initial spectrum of Ru(dcH$_2$b)$_2$(NCS)$_2$ on ZrO$_2$/CH$_3$CN, and the spectrum after photolysis at wavelengths greater than 400 nm.
Figure 3B:
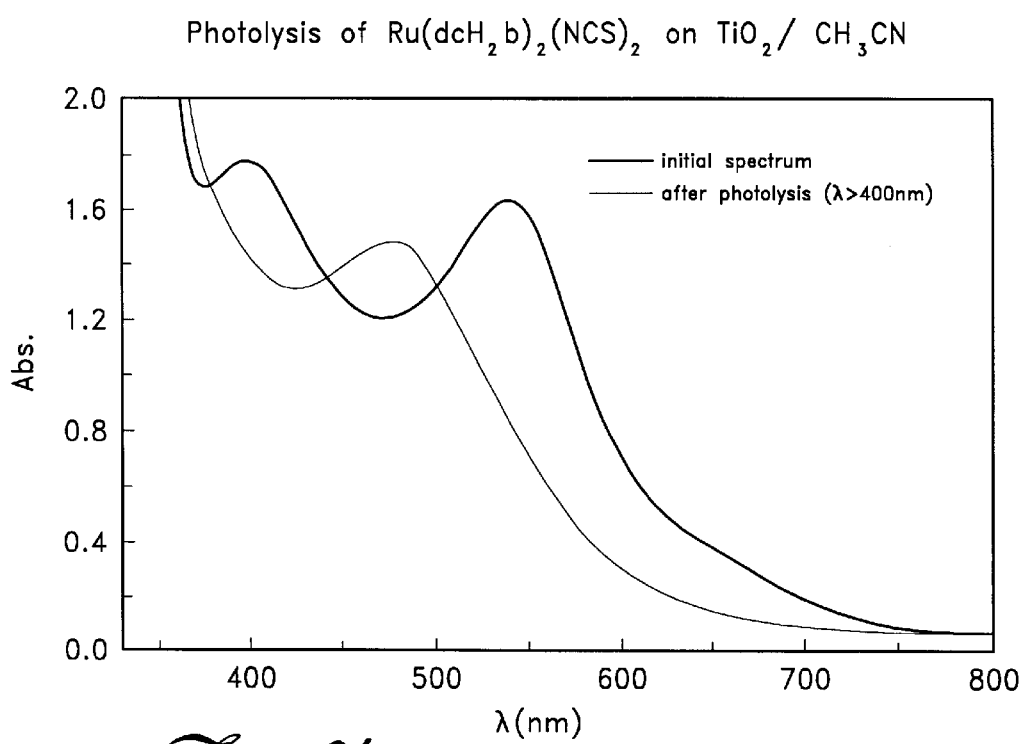
FIG. 3b shows the initial spectrum of Ru(dcH$_2$b)$_2$(NCS)$_2$ on TiO$_2$/CH$_3$CN, and the spectrum after photolysis at wavelengths greater than 400 nm.
Figure 4A:
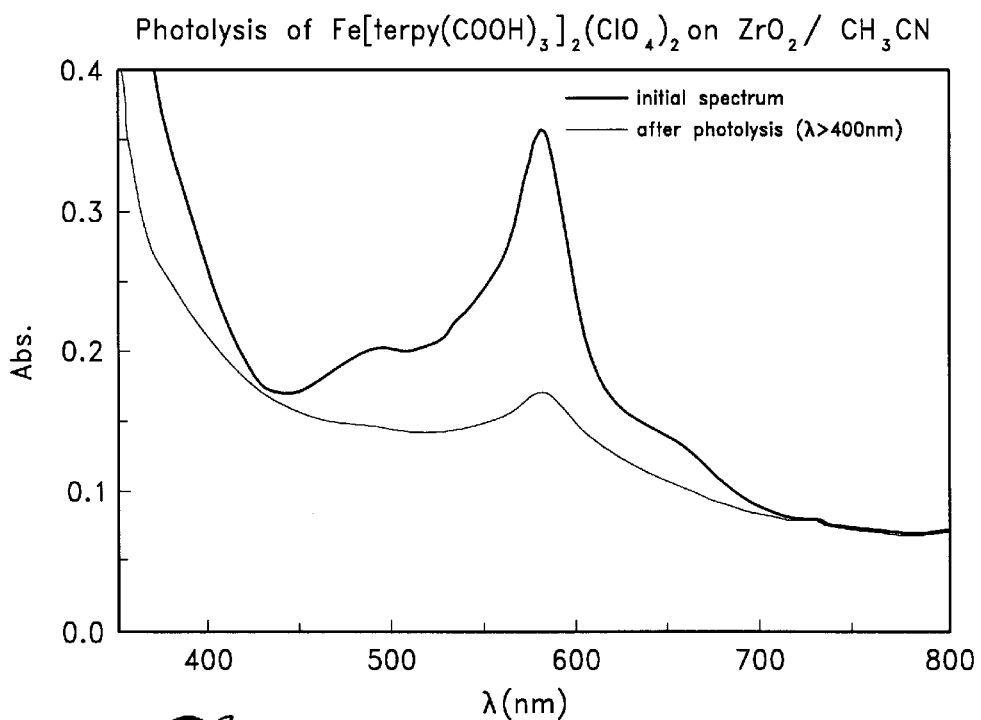
FIG. 4a shows the initial spectrum of Fe[terpy(COOH)$_3$]$_2$(ClO$_4$)$_2$ on ZrO$_2$/CH$_3$CN, and the spectrum after photolysis at wavelengths greater than 400 nm.
Figure 4B:
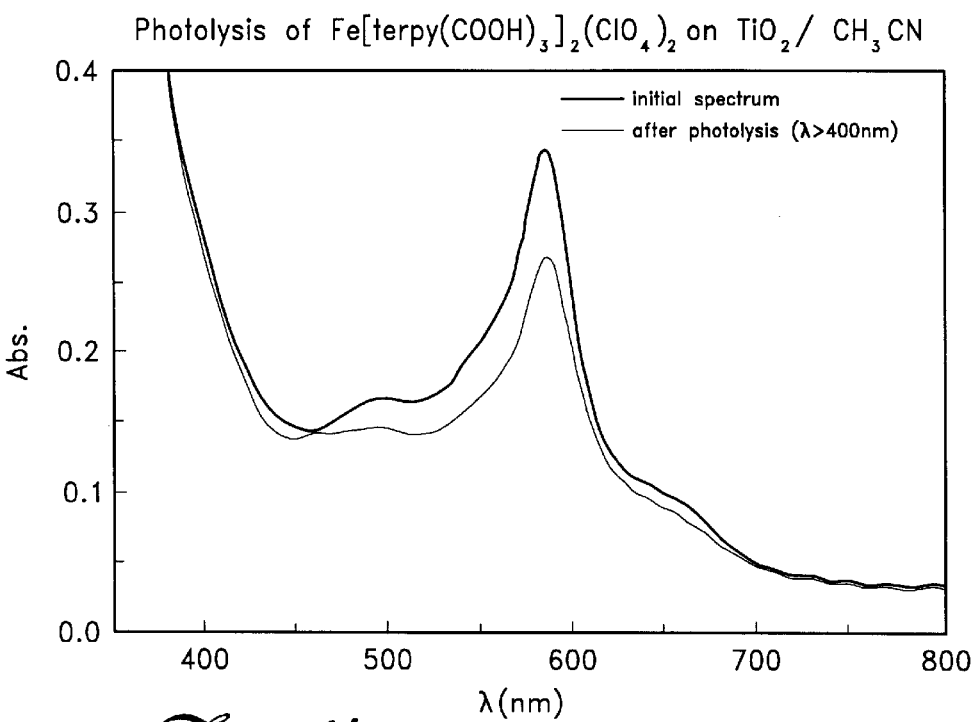
FIG. 4b shows the initial spectrum of Fe[terpy(COOH)$_3$]$_2$(ClO$_4$)$_2$ on TiO$_2$/CH$_3$CN, and the spectrum after photolysis at wavelengths greater than 400 nm.

The following description and examples illustrate a preferred embodiment of the present invention in detail. Those of skill in the art will recognize that there are numerous variations and modifications of this invention that are encompassed by its scope. Accordingly, the description of a preferred embodiment should not be deemed to limit the scope of the present invention.

Introduction

In preferred embodiments, three different types of molecular level information storage systems are contemplated, all of which operate through the use of organometallic transition metal complexes. These species, which characterize the systems as Type I, II or III, have in common the property of intense metal-to-ligand charge transfer (MLCT) absorption bands dominating the visible region (i.e., the wavelength range between 400 and 800 nm), and intense ligand centered (LC) transitions in the UV region (i.e., the wavelength range between 200 and 400 nm). Ultraviolet or visible light excitation promotes the molecular species into upper-lying, electronically-excited states. Molecular species in such excited states may show a particular reactivity when compared to the same molecule in the ground state.

Disclosed herein are different classes of transition metal complexes which, when anchored to the surface of a transparent solid substrate or included in a polymeric matrix, are capable of undergoing molecular level photochemical reactions which can produce a color change in the visible region or changes in the emissive properties of the molecular species. The permanent color changes, associated with modifications of the molecular composition or of the electronic structure, are produced by irradiating the molecules with UV-visible light and can be read in transmission. Permanent changes of the emissive properties, which are also associated with light induced modifications of the molecular composition or of the electronic structure, can be read in any direction by monitoring light emission from the excited molecular species.

Type I Systems

Type I systems generally comprise a film such as colloidal semiconductor or amorphous silica having an adsorbed photoreactive metal complex. The film is immersed in a coordinating solvent or in a solution containing a coordinating ligand. Light excitation, by light of appropriate wavelength, promotes the metal complex into an electronically excited state that is reactive towards ligand substitution reactions. The excited metal complex may react with either the coordinating solvent, or with a coordinating ligand dissolved in a suitable solvent. In both cases the reaction product is a new molecule which differs in color or emissive properties from the original metal complex.

In one preferred embodiment of a Type I system, the solvent is a carrier for a reactive species which reacts with the metal complex, thereby changing its color or emissive properties. Two such variations of this embodiment can be envisioned: (i) if the metal complex adsorbed on the solid substrate emits light, the reactive species can be selected from amongst those that can react with the excited metal complex to quench its emission; or (ii) if the metal complex absorbed on the solid substrate does not show any light emission under irradiation, then the reactive species can be selected from amongst those that can react with the excited metal complex to form a new species which emits light when irradiated with light of suitable wavelength. In either variation, the reaction results in a molecule which absorbs or emits light of wavelengths different from those of the unreacted metal complex. The differences in light absorption or light emission (i.e., color differences) can be used as a method of storing data by assigning one binary code valve (0 or 1) to the initial state, and the remaining binary code valve (0 or 1) to the reacted state.

In one embodiment, Type I systems comprise a thin film of a transparent nanocrystalline or amorphous metal oxide which has been functionalized with a metal complex belonging to a specific class of transition metal polypyridine complexes having a coordination number equal to six. These metal complexes are represented by the following formulas:

$$[M(N\text{—}N)_2L_2]^n$$

$$[M(N\text{—}N)L_4]^n$$

$$[M(N\text{—}N\text{—}N)L_3]^n$$

$$[M(N\text{—}N\text{—}N)_2]^n$$

wherein the total charge of the complexes, n, which is not specified, is given by the algebraic sum of the oxidation state of the metal center and by the charge of the coordinated ligands. M represents a transition metal, including iron, cobalt, nickel, copper, ruthenium, iridium, palladium, platinum, rhenium, osmium or rhodium, but most preferably iron or ruthenium. N—N represents a chromophoric polypyridine ligand such as 2,2'-bipyridyl substituted by one or two —COOH, —B(OH)$_2$, —PO$_3$H$_2$, or —R—PO$_3$H$_2$ groups (where R is a saturated or aromatic spacer group, e.g., hydrocarbons such as methylene, ethyl, propyl, etc. or phenyl groups); 1,10-phenanthroline substituted by one or two —COOH, —B(OH)$_2$, —PO$_3$H$_2$, or —R—PO$_3$H$_2$ groups (where R is as defined above); or 2,2'-biquinoline substituted by one or two —COOH, —B(OH)$_2$, PO$_3$H$_2$ or —R—PO$_3$H$_2$ groups (where R is as defined above). Where more than one N—N group is present in the compound (e.g., (N—N)$_2$), the N—N molecules may be the same or different. N—N—N represents a chromophoric terpyridyl ligand substituted by one, two, or three —COOH, —B(OH)$_2$, —PO$_3$H$_2$, or —R—PO$_3$H$_2$ groups (where R is as defined above), or substituted by phenyl, wherein the phenyl group is substituted by a —COOH, —B(OH)$_2$, —PO$_3$H$_2$, or —R—PO$_3$H$_2$ group (where R is as defined above). Preferably the substituents are in the para position. Where more than one N—N—N group is present in the compound (e.g., (N—N—N)$_2$), the N—N—N molecules may be the same or different. L independently is a non-chromophoric polydentate or monodentate ancillary ligand, e.g., NC—(CH$_2$)$_2$—CN, NC—(CH$_2$)$_3$—CN, NC—(CH$_2$)$_4$—CN, halide, NCS$^-$, N$_3^-$, —CH$_3^-$, H$^-$, oxalate, CO, CN$^-$, NO, H$_2$O, OH$^-$, NH$_3$, triazole, pyridine, pyrazine, 4,4'-bipyridine, 4,4'-bipyridylethane, 4,4'-bipyridylethylene, 4-cyanopyridine, dicyanobenzene, diethylenediamine, NO$_2^-$, or acetylacetone. Alternatively, L is a coordinating solvent such as acetylacetone, methanol, acetonitrile, acetone, tetrahydrofuran, ethanol, dimethylformamide, or dimethylsulfoxide.

Members of this class of complexes may be prepared according to methods published in the literature (see, e.g., R. Argazzi, C. A. Bignozzi, T. A. Heimer, P. Castellano, G. J. Meyer *Inorg. Chem.* 33, 5741 (1994); R. Argazzi, C. A. Bignozzi, G. M. Hasselmann and G. J. Meyer *Inorg. Chem.* 37, 4533 (1998); A. C. Lees, B. Evrard, T. E. Keyes, G. J. Vos, C. J. Kleverlaan, M. Alebbi, C. A. Bignozzi *Eur. J. Inorg. Chem.* 2309 (1999); C. A. Bignozzi, R. Argazzi, C. J. Kleverlaan *Chem. Soc. Rev.* 29, 87 (2000) each of which is incorporated herein by reference).

The metal complexes (hereafter "(A)"), have several general properties. In a preferred embodiment, the complexes can be adsorbed on the surface of a transparent wide band gap semiconductor such as Zro$_2$, TiO$_2$, SnO$_2$, or ZnO, Nb$_2$O$_5$, or on amorphous silica, SiO$_2$ (hereafter "solid substrates"). Other suitable substrates for binding or absorbing the complexes include those wherein a sufficiently strong linkage can be formed between the metal complex and the solid substrate. Such linkages could include, for example, linkages based on esters and peptide-type bonds with polymeric films or silane-type bonds with amorphous silica or with semiconductors such as oxides of titanium, zinc, zirconium and tin. Consequently, polymeric or inorganic substrates may be used in the present invention. It could also be possible to prepare Langmuir Blodget (LB) films of selected complexes on thin layers of gold. (see, e.g., H. Huesmann, C. A. Bignozzi, M. T. Indelli, L. Pavanin, M. A. Rampi, D. Mobius *Thin Solid Films*. 284, 62 (1996) incorporated herein by reference).

Whether the substrate is polymeric, amorphous or nanocrystalline does not affect the performance of the device. Moreover, the substrate may be transparent or opaque to the light wavelength used to measure changes in the emissive properties of the photochromic film. If an information storage medium prepared from Type I systems is read in transmission mode, i.e., by passing a beam of light through the medium and measuring a change in the transmission, then the substrate should be transparent to the light wavelengths of interest. If the information storage medium is read by measuring changes in a beam of light reflected off the medium, then either a transparent or an opaque solid substrate could be used.

The substrate can be a pure material, or a mixture, e.g., mixtures of tin, zinc, and titanium oxides, and the like, or mixtures of such oxides with amorphous silica. Although in a preferred embodiment the substrate is a semiconductor, it is not necessary that the substrate be semiconducting. Consequently, as noted above, a wide variety of materials may be used as the substrate. Materials for the substrate should be selected as not to hinder the ability of the adsorbed metal complex to undergo a photosubstitution reaction with a coordinating solvent or coordinating group in solution.

The linkage between the metal complex and the solid substrate is provided by the functional groups which are bound to the polypyridine ligands, i.e., the —COOH, —B(OH)$_2$, —PO$_3$H$_2$, and —R—PO$_3$H$_2$ groups. One such substituent is sufficient to bind the complex to the substrate surface. Infrared and Raman spectroscopy of the metal complex—substrate system suggests that the linkage between carboxylic functions and titanium or tin dioxide is in part covalent and in part electrostatic (see, e.g., T. J. Meyer, G. J. Meyer, B. W. Pfennig, J. R. Schoonover, C. J. Timpson, J. F. Wall, C. Kobusch, X. Chen, B. M. Peek, C. G. Wall, W. Ou, B. W. Erickson, C. A. Bignozzi *Inorg. Chem.* 33, 3952 (1994); R. Argazzi, C. A. Bignozzi, T. A. Heimer, P. Castellano, G. J. Meyer *Inorg. Chem.* 33, 5741 (1994)). Bonding to the substrate via an —OH substituent is also possible, provided the —OH group behaves as a weak acid.

The Type I metal complexes show a remarkable photochemical stability when adsorbed on the solid substrate in the absence of solvents, humidity, and oxygen. The metal complex, when anchored to the solid substrate, undergoes efficient light induced reactions in the presence of a coordinating solvent (hereafter "(B)"), or of a solution containing a coordinating species (hereafter also "(B)"), to form a new molecular species (hereafter "(C)"). Preferably, the photosubstitution reaction takes place in (A) at the coordinated ligand L.

The combination of solid substrate/(A)/(B) is suitable for use in optical information recording media, provided that selective light excitation of (A) will promote this species in an upper lying electronically excited state (hereafter "(A*)"), and that subsequently (A*) will efficiently react with component (B) to form as a reaction product a new molecular species (hereafter "(C)"), showing an absorption spectrum different from that of (A).

These processes are represented in equations (1) and (2):

$$(A) + h\nu \rightarrow (A^*) \tag{1}$$

$$(A^*) + (B) \rightarrow (C) \tag{2}$$

Data can thus be written by immersing the metal oxide/(A) system under a layer of a suitable solvent (B), or of a solution containing a specific coordinating component (B), and irradiating (A) with a laser beam which will promote (A) in the reactive state (A*). The reaction of (A*) with (B) will ultimately form (C). Removal of the solvent or coordinating component (B) renders the reaction irreversible. Data can thus be stored in the solid device in digital form, with color or emissive properties of species (A) representing a value of 1 and the color or emissive properties of species (C) representing a value of 0, or vice-versa. Data is preferably read in transmission mode by choosing a wavelength in the spectral region from 400 to 800 nm which can be selectively absorbed by component (A) or by component (C). Otherwise, data can be read in transmission mode when the changes in optical density at the reading wavelength are greater than a specific value.

In a preferred embodiment, (B) comprises coordinating ligands having strong ligand field character, such as dithiocarbamate, thiocyanate, cyanide, carbonyl, phosphine, and polypyridine ligands, wherein the polypyridine ligands functionalized with aromatic units show long-lived phosphorescence. Solvents having these properties, such as acetonitrile, may also be used. In this embodiment, photoreaction of the excited (A*) with (B) can ultimately form a luminescent component (C). In the case of a metal complex (A) that is intrinsically luminescent, component (B) will be chosen from amongst those coordinating ligands that will produce a non-luminescent metal complex (C), or, alternatively, a metal complex (C) showing a distribution of the emission intensity different from that of (A).

The use of such a light emitting species for reading stored information may result in an improved read-only memory (ROM) device, provided that the emitting molecular species possesses a high emission quantum yield, preferably higher than 0.01. The emission of light can be detected by irradiating a solid matrix incorporating (A) and (C) with a laser beam with a wavelength in the range of 400 to 800 nm, and monitoring the emission spectrum or a specific emission wavelength, preferably in the range of the emission maximum of component (A) or (C). The binary code can then be correlated with the presence or absence of luminescence from (A) or (C).

Where metal oxides are used as the substrate, photoactive molecular species (A) may be deposited on oxides of titanium, zirconium, tin, silicon, niobium and zinc as well as amorphous silica. These materials may be produced in colloidal form and deposited on a light transmitting glass or polymeric substrate to obtain a thin transparent film. Films of different thickness can be deposited by deep coating, screen printing, spray coating, ink jet printing or other methods well known in the art. Air drying and successive heating in the temperature range of about 100–500° C. may be used to adhere the colloidal oxide film to the glass or polymeric support. The manufacture of a photo-reactive film for an information storage device is completed by absorbing the photoactive species (A) on the surface of the colloidal oxide film. This is accomplished by immersing the semiconductor film in a solution containing the photoactive species (A) dissolved in a suitable inorganic or organic solvent. Alternatively, the photoactive species (A) may be initially adsorbed on the surface of the metal oxide particle. The particles with adsorbed (A) may then be deposited on the transparent glass or polymeric support and heated between 50 and 150° C. to obtain the thin transparent film.

Irradiation of (A) supported on the metal oxide is accomplished with a lamp or a laser beam having a wavelength in the 400–800 nm spectral region. The information storage ability of such a photochromic substrate is mainly dependent upon the optical resolving power of the excitation and probe lasers. Considering a distribution of metal oxide particles covered by (A) wherein the particles have an average diameter in the range of 10–50 nm, the optical resolution of the device will be maximized by using laser beams with diameters comparable to those of the nano-particles.

Once the information has been optically written by irradiating the nanoparticles with a lamp or laser beam, the recording layer of the device may further be protected by a thin layer of transparent polymeric film. The protective layer prevents interaction between the (A) and (C) components and external reactants, e.g., humidity and oxygen. In a preferred embodiment, the polymeric film comprises hydrophobic polymeric films, such as polystyrene, polycarbonate, polyvinylpyridine, and polymethylmethacrylate, that prevent contact of the metal complexes with water.

Type II Systems

Type II systems involve light-induced photoisomerization of a molecule. The photoisomerization reaction is irreversible. The photoisomerized molecule absorbs light of wavelengths which differ from the original molecule. The differences in light absorption can be used as a method of storing data.

In one embodiment, a Type II system comprises a transparent polymeric film or amorphous silica support and a transition metal complex characterized by two electronically excited states, one of which is photo-reactive towards an isomerization reaction. The metal complex may be adsorbed on the surface of the amorphous silica or may be dispersed within the polymeric film. The isomerization reaction involves a change in the internal bonds or internal electronic structure of a molecular component, and leads to a permanent color change in the irradiated molecule. These photo-induced modifications of the internal electronic structure of the molecule may occur in fluid solution or when the molecule is adsorbed on amorphous silica or included in a transparent polymeric matrix.

In one embodiment, the metal complexes used in Type II systems comprise polynuclear metal complexes containing the norbornadiene ligand, which is bridged via a cyano group to one or two ruthenium tetraamine moieties. The moieties may be attached to the surface of the metal oxide support through the acid functionality of an isonicotinic acid ligand or py-COOH ligand coordinated at the ruthenium center through the nitrogen of the pyridine units, or via py-PO$_3$H$_2$ or py-CH$_2$—PO$_3$H$_2$ functions coordinated at the ruthenium center through the nitrogen of the pyridine units. When the metal complex is included in a transparent polymeric matrix, suitable ligands can also include esters of py-COOH, py-PO$_3$H$_2$, and py-CH$_2$—PO$_3$H$_2$. The hydrocarbyl group of the ester preferably contains from 1 to 6 carbon atoms, more preferably 1 to 3 carbon atoms. In a preferred embodiment, the methyl or ethyl esters are used, e.g., py-COOCH$_3$, py-PO$_3$HCH$_3$, py-CH$_2$—PO$_3$HCH$_3$, py-COOCH$_2$CH$_3$, py-PO$_3$HCH$_2$CH$_3$, and py-CH$_2$—PO$_3$HCH$_2$CH$_3$. The ester functionality improves the solubility of the complex in the polymer (e.g., polyvinylpyridine or polymethylmethacrylate) when compared to the complex with carboxylic or phosphoric acid functionality.

In a preferred embodiment of the Type II systems, mononuclear as well as polynuclear transition metal complexes of the type represented by the following formulas are used:

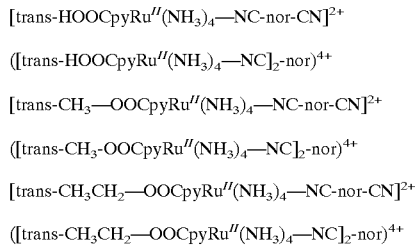

wherein HOOCpy is isonicotinic acid, CH$_3$—OOCpy is the methyl ester of isonicotinic acid, CH$_3$CH$_2$—OOCpy is the ethyl ester of isonicotinic acid, the trans configuration is that of the Ru center, and NC-nor-CN is the dicyanonorbornadiene ligand. These complexes undergo a color change when irradiated with light in the UV region, but the initial color is unaffected by irradiation at wavelengths longer that 500 nm. The absorption spectra of these species are characterized by intense absorption bands in the visible region. Such absorption is the result of MLCT transitions from the d orbitals of the Ru(II) center to antibonding π* orbitals localized on the HOOCpy and NC-nor-CN ligands, and by intense LC absorption bands in the UV region, due to π–π* transitions localized on the HOOCpy and NC-nor-CN ligands. When these types of molecular species are irradiated with UV light, the isomerization of the norbornadiene to quadricyclene occurs, with a concomitant loss of intensity of electronic transitions involving orbitals of the norbornadiene moiety. This results in a bleaching of the absorption spectrum in the UV and visible regions. No variations in the initial absorption spectra are observed when the complexes are irradiated at wavelengths longer than 500 nm.

The Type II systems of the present invention which use a charge transfer complex include a coordinated norbornadiene ligand. The complex exhibits photochromic behavior only when LC states localized on norbornadiene ligand (such as π–π* states) are populated. The photochromic behavior is normally obtained by exciting the metal complex by irradiating in the UV region.

In a further embodiment of the present invention, Type II devices using transition metal complexes of the following general formulas are also contemplated:

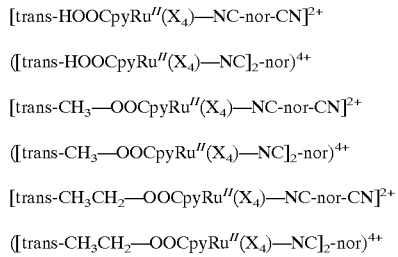

wherein X$_4$ represents a polyaza or polythio macrocycle such as N$_4$(CH$_2$)$_{10}$ or S$_4$(CH$_2$)$_{10}$. Species of the following general formulas are contemplated as well:

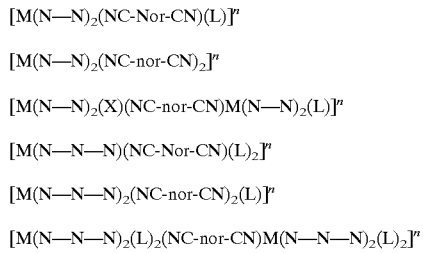

where the total charge, n, which not specified, is given by the algebraic sum of the oxidation state of the metal center and the charge of the coordinated ligands. Generally, the value of n will vary from –12 to +6 when the transition metal complexes described below are used. With different transition metal complexes, or may vary outside these ranges. M represents a transition metal, preferably cobalt, osmium or rhenium, but more preferably iron or ruthenium. N—N represents a chromophoric polypyridine ligand such as a 2,2'-bipyridyl unsubstituted or substituted by one or two —COOH, —COOC$_2$H$_5$, —COOCH$_3$, —B(OH)$_2$, —PO$_3$H$_2$, or —R—PO$_3$H$_2$ groups (where R is a saturated or aromatic spacer group, hydrocarbons such as methylene, ethyl, propyl, etc. or phenyl groups); 1,10-phenanthroline unsubstituted or substituted by one or two —COOH, —COOC$_2$H$_5$, —COOCH$_3$, —B(OH)$_2$, —PO$_3$H$_2$, or —R—PO$_3$H$_2$ groups (where R is as defined above); 2,2'-biquinoline unsubstituted or substituted by one or two —COOH, —COOC$_2$H5, —COOCH$_3$, —B(OH)$_2$, —PO$_3$H$_2$, or —R—PO$_3$H$_2$ groups (where R is as defined above). N—N—N represents a chromophoric terpyridyl unsubstituted or substituted by one, two or three —COOH, —COOC$_2$H$_5$, —COOCH$_3$, —B(OH)$_2$, —PO$_3$H$_2$, or —R—PO$_3$H$_2$ groups (where R is as defined above), or substituted by phenyl, wherein the phenyl group is unsubstituted or substituted by a —COOH, —COOC$_2$H$_5$, —COOCH$_3$, —B(OH)$_2$, —PO$_3$H2, or —R—PO$_3$H$_2$ group (where R is as defined above). Preferably, these phenyl substituents are in para position. Where more than one N—N or N—N—N group is present in the complex, the individual N—N or N—N—N groups may be the same or different. L is a non-chromophoric polydentate or monodentate ancillary ligand, e.g., halide, NCS$^-$, oxalate, CO, CN$^-$, NO, pyridine, H$_2$O, OH$^-$, NH$_3$, diethylenediamine, NO$_2^-$, NC—(CH$_2$)$_2$—CN, NC—(CH$_2$)$_3$—CN, NC—(CH$_2$)$_4$—CN, N$_3^-$, —CH$_3^-$, H$^-$, triazole, pyrazine, 4,4'-bipyridine, 4,4'- bipyridylethane, 4,'4-bipyridylethylene, 4-cyanopyridine, dicyanobenzene, diethylenediamine, $NO_2^-$, acetylacetone, or a strongly coordinating solvent such as acetonitrile, water, dimethylsulfoxide, or dimethylformamide. Where more than one L ligand is present in the complex, the individual ligands L may be the same or different.

It should be noted that $[M(N—N)_2(X)(NC\text{-nor-}CN)M(N—N)_2(L)]^n$ and $[M(N—N—N)_2(L)_2(NC\text{-nor-}CN)M(N—N—N)_2(L)_2]^n$ are binuclear species wherein the dicyanonorbomadiene acts as a bridging ligand between the metal centers.

In yet another embodiment, the dicyanonorbomadiene ligand (NC-nor-CN) can be substituted by a norbomadiene ligand having two pyridine units covalently linked in the para position through a carbon atom, or through one or two methylene spacers (e.g., py-nor-py; py-$CH_2$-nor-$CH_2$-py; or py-$(CH_2)_2$-nor-$(CH_2)_2$-py).

A key property of $[M(N—N)_2(NC\text{-Nor-}CN)(L)]^n$, $[M(N—N)_2(NC\text{-nor-}CN)_2]^n$, $[M(N—N)_2(X)(NC\text{-nor-}CN)M(N—N)_2(L)]^n$, $[M(N—N—N)(NC\text{-Nor-}CN)(L)_2]^n$, $[M(N\text{-}N\text{-}N)_2(NC\text{-nor-}CN)_2(L)]n$, and $[M(N—N—N)_2(L)_2(NC\text{-nor-}CN)M(N—N—N)_2(L)_2]^n$ is the presence of MLCT states involving $\pi^*$ orbitals of the polypyridine ligands. Once populated, these states promptly deactivate to ground state, and are at a lower energy with respect to MLCT states involving $\pi^*$ orbitals of the norbornadiene.

Type III Systems

Type III systems incorporate a photochromic material obtained by depositing a suitable combination of a transition metal complex (acting as a molecular sensitizer) and an electron acceptor on a transparent film of a wide band gap semiconductor such as tungsten trioxide, titanium dioxide, zinc dioxide, or tin dioxide, more preferably nanocrystalline titanium dioxide. The Type III systems work by having a solid semiconductor substrate with an empty conduction band capable of functioning as a transportation channel for electrons injected by an adsorbed molecular sensitizer. The molecular sensitizer (hereafter "(S)") absorbs light in the visible region. This process promotes (S) to an electronically excited state capable of injecting electrons to the conduction band of the semiconductor. Electron injection is fast and competitive with radiative and nonradiative deactivation of the excited (S), and will compete with excited state chemical reactions. The second component adsorbed on the semiconductor surface (hereafter "(Q)") accepts electrons from the semiconductor, giving rise to a stable reduced form (Q$^-$). The functioning of a Type III device is generally illustrated in FIG. 15. In FIG. 15, a molecular sensitizer (S) injects an electron into the conduction band of a titanium dioxide substrate, in the process undergoing a color change (here, a bleaching of the absorption spectrum) from yellow (unoxidized form) to white (oxidized form). The electron acceptor accepts the electron, in the process undergoing a color change from blue (unreduced form) to red (reduced form). Typically, a more dramatic spectral change is observed for the reduction of the electron acceptor than for the oxidation of the molecular sensitizer. Typically, the net result of the color change of both the molecular sensitizer and electron acceptor are measured. However, if one of either the molecular sensitizer or electron acceptor has a more intense color change, while the color change of the other is less perceptible, then the more intense color change could be measured.

The photochromic properties of such materials, which can be supported on a transparent glass or polymer substrate, are related to the interfacial electron transfer processes schematized by equations (3) and (4):

$$(S)/TiO_2/(Q) + h\nu \rightarrow (S^+)/TiO_2^-/(Q) \qquad (3)$$

$$(S^+)/TiO_2^-/(Q) \rightarrow (S^+)/TiO_2/(Q^-) \qquad (4)$$

The color changes are due, in particular, to the formation of the oxidized form of the sensitizer (S$^+$) and of the reduced form of the electron acceptor (Q$^-$). Charge recombination between (Q$^-$) and (S$^+$), illustrated by equation (5), slowly restores the initial color of the material:

$$S^+/TiO_2^-/Q^- \rightarrow S/TiO_2/Q \qquad (5)$$

The initial color can also be slowly restored by reaction of the charge separated system S$^+$/TiO$_2$/Q$^-$ with molecular oxygen.

The disclosed photochromic materials are designed to maintain the color of the charge separated form, S$^+$/TiO$_2$/Q$^-$, when exposed to continuous irradiation with visible light, and to restore the initial color of the S/TiO$_2$/Q form when irradiation of the material is interrupted. Consequently, Type III systems are suitable for long term stable data storage only when it is expected that the systems will be continuously exposed to the appropriate wavelength of light.

Useful molecular sensitizers (S) can be selected from known transition metal complexes based on polypyridyl ligands (see, e.g., C. A. Bignozzi, J. R. Schoonover, F. Scandola *Progr. Inorg. Chem.* 44, 1–95 (1997); R. Argazzi, C. A. Bignozzi, T. A. Heimer, G. J. Meyer *Inorg. Chem.* 36, 2 (1997); J. A. Moss, R. Argazzi, C. A. Bignozzi, G. J. Meyer *Inorg. Chem.* 36, 762 (1997); R. Argazzi, C. A. Bignozzi, T. A. Heimer, F. N. Castellano, G. J. Meyer. *J. Phys. Chem.* 101, 2591 (1997); R. Argazzi, C. A. Bignozzi, G. Hasselmann and G. J. Meyer. *Inorg. Chem.* 37, 4533 (1998); C. G. Garcia, N. Y. Marakami Iha, R. Argazzi, C. A. Bignozzi *J. Photochem. Photobiol. A: Chemistry* 115, 239 (1998); M. T. Indelli, C. A. Bignozzi, F. Scandola, J. P. Collin *Inorg. Chem.* 37, 6084 (1998); C. A. Bignozzi, R. Argazzi, C. J. Kleverlaan *Chem. Soc. Rev.* 29, 87 (2000)). These metal complexes are represented by the following formulas:

$[M(N—N)_2L_2]^n$ $[M(N—N)L_4]^n$ $[M(N—N—N)L_3]^n$ $[M(N—N—N)_2]^n$ wherein the total charge of the complexes, n, which is not specified, is given by the algebraic sum of the oxidation state of the metal center and by the charge of the coordinated ligands. M represents a transition metal, such as cobalt, nickel, copper, iridium, palladium, platinum, rhenium, osmium or rhodium, but most preferably iron or ruthenium. N—N represents a chromophoric polypyridine ligand such as 2,2'-bipyridyl substituted by one or two —COOH, —B(OH)$_2$, —PO$_3$H$_2$, or —R—PO$_3$H$_2$ groups (where R is a hydrocarbon such as a saturated or aromatic spacer group, e.g., methylene ethyl, propyl, etc. or phenyl); 1,10-phenanthroline substituted by one or two —COOH, —B(OH)$_2$, —PO$_3$H$_2$, or —R—PO$_3$H$_2$ groups (where R is as defined above); or 2,2'-biquinoline substituted by one or two —COOH, —B(OH)$_2$, —PO$_3$H$_2$, or —R—PO$_3$H$_2$ groups (where R is as defined above). Where more than one N—N group is present in the compound (e.g., (N—N)$_2$), the N—N moiety may be the same or different. N—N—N represents a chromophoric terpyridyl ligand substituted by one, two, or three —COOH, —B(OH)$_2$, —PO$_3$H$_2$, or —R—PO$_3$H$_2$ groups (where R is as defined above), or substituted by phenyl, wherein the phenyl group is substituted by a —COOH, —B(OH)$_2$, —PO$_3$H$_2$, or —R—PO$_3$H$_2$ groups (where R is as defined above). Preferably the substituents are in the para position. Where more than one N—N—N group is present in the compound (e.g., (N—N—N)$_2$), the N—N—N groups can be the same or different. L, which can be the same or different, is a chromophoric polypyridine ligand, either unsubstituted or substituted by —COOH, —B(OH)$_2$, —PO$_3$H$_2$, or —R—PO$_3$H$_2$ groups (where R is as defined above), or a non—chromophoric monodentate or polydentate ancillary ligand, such as NC—(CH$_2$)$_2$—CN, NC—(CH$_2$)$_3$—CN, NC—(CH$_2$)$_4$—CN, halide, NCS$^-$, N$_3^-$, —CH$_3^-$, H$^-$, oxalate, CO, CN—, NO, H$_2$O, OH—, NH$_3$, pyrazine, 4,4'-bipyridine, 4,4'-bipyridylethane, 4,4'-bipyridylethylene, triazole, pyridine, 4-cyanopyridine, dicyanobenzene, diethylenediamine, acetylacetone or NO$_2^-$.

Alternatively, molecular sensitizers of a new design can be used. Examples of such include [(4,4'-HPO$_3$CH$_2$)$_2$bpyRu(CN)$_4$]$^{4-}$, [(4,4'-HPO$_3$)$_2$bpyRu(CN)$_4$_]$^{4-}$, (4,4'-HPO$_3$CH$_2$)$_2$(bpy)Re(CO)$_3$(X), [(dcbH$_2$)Ru(CN)$_4$]$^{4-}$, and (4,4'-HPO$_3$)$_2$(bpy)Re(CO)$_3$(X), wherein X is CN$^-$, NCS$^-$, py, NC—(CH$_2$)$_2$—CN, NC—(CH$_2$)$_3$—CN, NC—(CH$_2$)$_4$—CN, halide, CO, NO, pyridine, 4-cyanopyridine, dicyanobenzene, H$_2$O, NH$_3$, or NO$_2^-$.

Suitable electron acceptors can be selected from transition metal complexes of general structure I and II:

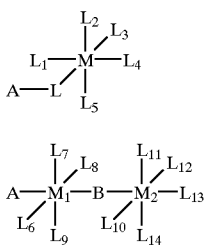

wherein L through L$_6$ represent the ligands attached to the metal center.

L represents a ligand which is further modified by having a covalent bond to A. A represents a moiety suitable for interaction with the substrate, such as a pyridine-type ligand substituted in the para position by a —COOH, —B(OH)$_2$, PO$_3$H$_2$, or —R—PO$_3$H$_2$ group, where R is a hydrocarbon spacer group. In a preferred embodiment, the spacer group is conjugated or aromatic. The presence of a conjugated or aromatic spacer group increases the molar extinction coefficient (ε) of the complex, which results in an increase in the color intensity. Other spacer groups, e.g., branched or straight saturated hydrocarbons, branched or straight non-conjugated unsaturated hydrocarbons, or carbocyclic groups, can also be suitable spacer groups, however. The spacer group may incorporate additional hydrocarbyl substituents along the backbone. Non-limiting examples of suitable spacer groups include methylene, phenyl, and naphthyl. It is preferred that the backbone of the spacer group include a minimum number of carbon atoms, so as to minimize the electron transfer distance, thereby increasing electron transfer. In a preferred embodiment, a spacer having up to about seven carbon atoms in the backbone is used, although longer backbones could also be suitable.

B represents a bridging ligand providing a stable linkage between the two metal moieties, M$_1$ and M$_2$, and the ligands. Suitable bridging groups include bidentate ligands and any other ligand capable of bridging the two metal moieties. Non-limiting examples of some suitable bridging ligands include Cl$^-$, CN$^-$, 4,4'-bipyridyl, pyrazine, NCS$^-$, N$_2$, O, and OH$^-$.

L through L$_6$, as well as L$_7$ through L$_{14}$, are monodentate or polydentate ligand with can be selected from NC—(CH$_2$)$_2$—CN, NC—(CH$_2$)$_3$—CN, NC—(CH$_2$)$_4$—CN, halide, NCS, oxalate, CO, CN$^-$, NO, pyridine, 4-cyanopyridine, dicyanobenzene, H$_2$O, OH$^-$, NH$_3$, diethylenediamine, NO$_2^-$, 2,2'-bipyridyl unsubstituted or substituted by methyl groups, and 1,10-phenanthroline unsubstituted or substituted by methyl groups. M$_1$ and M$_2$ are transition metal ions selected from the first, second, and third transition metal row of the periodic table which are capable of undergoing reversible changes of oxidation state. Suitable metal centers include copper, cobalt, nickel, iridium, palladium, rhenium, osmium or rhodium, more preferably iron or ruthenium.

In yet another embodiment, polynuclear metal complexes structurally similar to II but with higher nuclearity (more than two metal centers linked to each other) can also be used.

Photochromic devices of Type III can be prepared by immersing a film comprising a semiconductor, e.g., titanium dioxide, supported on glass or on a polymeric material, in a solution containing dissolved molecular sensitizer (S) and electron acceptor (Q). The surface coverage that can be obtained with the two species is proportional to their molar concentration in solution. With a 1:1 molar ratio of (S) to (Q), an equal amount of the two species are adsorbed on the semiconductor particles. Alternatively, (S) and (Q) can be adsorbed on the surface of the colloidal particles of the semiconductor and then deposited on a solid substrate such as glass or a polymeric material.

For example, a method for manufacturing an optical information storage medium using Tape III systems may comprise:

(i) providing a molecular sensitizer represented by one of the formulas:

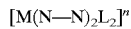

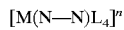

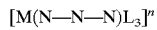

and

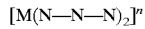

wherein M is a transition metal having an oxidation state;

N—N is a chromophoric polypyridine ligand having a charge and incorporating from one to two substituents selected from the group consisting of —COOH, —B(OH)$_2$, —PO$_3$H$_2$, and —R—PO$_3$H$_2$, wherein R is a saturated or aromatic hydrocarbon group;

N—N—N is a chromophoric terpyridyl ligand having a charge and incorporating from one to three substituents selected from the group consisting of —COOH, —B(OH)$_2$, —PO$_3$H$_2$, —R—PO$_3$H$_2$, and phenyl, wherein the phenyl incorporates one or more substituents selected from the group consisting of —COOH, —B(OH)$_2$, —PO$_3$H$_2$, —R—PO$_3$H$_2$, wherein R is a saturated or aromatic hydrocarbon group;

L is a nonchromophoric monodentate or polydentate ancillary ligand having a charge; and n is the total charge comprising an algebraic sum of the oxidation state of M and the charge of the ligands;

(ii) providing an electron acceptor represented by one of the formulas:

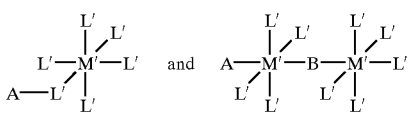

wherein A is pyridine substituted in the para position by a moiety selected from the group consisting of —COOH, —B(OH)$_2$, PO$_3$H$_2$, and —R—PO$_3$H$_2$, wherein R is a hydrocarbon linking group;

B is a bridging ligand;

L', which can be the same or different, is a ligand selected from the group consisting of NC—(CH$_2$)$_2$—CN, NC—(CH$_2$)$_3$—CN, NC—(CH$_2$)$_4$—CN, halide, NCS$^-$, oxalate, CO, CN$^-$, NO, pyridine, 4-cyanopyridine, dicyanobenzene, H$_2$O, OH$^-$, NH$_3$, diethylenediamine, NO$_2^-$, 2,2'-bipyridyl unsubstituted or substituted by one or more methyl groups, and 1,10-phenanthroline unsubstituted or substituted by one or more methyl groups; and M', which can be the same or different, is a transition metal capable of undergoing a reversible change of oxidation state (iii) providing a substrate comprising a wide band gap semiconductor; and (iv) adsorbing an intimate mixture of said molecular sensitizer and said electron acceptor on the substrate, thereby forming a molecular sensitizer-electron acceptor-substrate system.

The substrate may be amorphous, nanocrystalline, and be selected from the group consisting of tungsten trioxide, titanium dioxide, zinc dioxide, and tin dioxide. The semiconductor may comprise particles in colloidal form, wherein the particles have an average diameter ranging from about 10 nm to about 50 nm.

For this embodiment step (iii) may comprise depositing the semiconductor in colloidal form on a support comprising a light transmitting glass or a transparent polymeric material, and thereafter heating the deposited semiconductor at a temperature of between about 100° C. to about 500° C.

Step (iv) comprises immersing the substrate in a solution of the molecular sensitizer and electron acceptor, removing the substrate from solution, and drying the substrate.

Step (iv) may alternately comprise mixing the colloidal semiconductor with a solution of molecular sensitizer and electron acceptor, drying the colloidal semiconductor, depositing the colloidal semiconductor on a support comprising a light transmitting glass or a transparent polymeric material, and thereafter heating the deposited semiconductor at a temperature of between about 50° C. to about 150° C.

An additional step (v) may be added, which comprises irradiating a region of the system with a light, whereby the molecular sensitizer absorbs the light and injects an electron into an empty conduction band of the substrate, wherein the electron acceptor accepts the electron, wherein a separation of charge between the oxidized molecular sensitizer and reduced electron acceptor is generated, wherein the oxidized molecular sensitizer has a different absorption spectrum than the molecular oxidizer in an unoxidized state, and wherein the reduced electron acceptor has a different absorption spectrum than the electron acceptor in the unreduced state.

An additional step (vi) may also be used, which comprises applying a thin layer of a transparent polymeric film atop the recording layer.

In one preferred embodiment, inkjet techniques are used to deposit on a substrate colloidal semiconductor particles upon which both (S) and (Q) are absorbed. In inkjet printing, an "ink" is emitted from nozzles in the print head as it passes over a medium. Different inkjet technologies include, for example, thermal inkjets, wherein the ink is heated to create a bubble until the pressure forces it to burst and hit the media; and piezoelectric inkjets, wherein a piezo crystal at the back of the ink reservoir flexes when current is applied, thereby forcing a drop of ink out of the nozzle. In a preferred embodiment, the "ink" used in the inkjet printer comprises a suspension of the colloidal semiconductor particles with adsorbed (S) and (Q) in a suitable liquid, e.g., water, optionally with other components (other dyes, solvents, additives, and the like). Suitable media upon which the "ink" can be printed include any surface upon which the semiconductor particles can be absorbed, adsorbed or adhered. Non-limiting examples of suitable surfaces include paper, plastics, glass, and the like. Use of other printing techniques to apply the semiconductor particles, in the appropriate liquid or powder form, to different media are also contemplated, e.g., silk screening, laser printing, offset printing, lithography, and the like.

EXAMPLES

Preferred embodiments are now illustrated by a series of experimental examples related to the three types of photochromic materials. These examples are not intended to limit the scope of the invention in any way.

Analytical Instrumentation $^1$H NMR spectra were recorded for the complexes at 300 MHz and 25° C. on a Varian Gemini 300 spectrometer. $^{31}$P{$^1$H} NMR spectra were measured at 25° C. and 81 MHz using a Bruker 200 spectrometer or at 121 MHz and 25° C. using a Varian Gemini 300 spectrometer. Chemical shifts in ppm to high frequency of 85% H$_3$PO$_4$. UV-visible spectra were recorded on a Lambda 40 Perkin Elmer spectrophotometer.

Type I Devices Utilizing The [Ru(dcH$_2$b)$_2$(L)$_2$] Complex

Transparent films based on nanocrystalline zirconium dioxide and titanium dioxide were prepared and deposited on glass according to methods reported in the literature (R. Argazzi, C. A. Bignozzi, T. A. Heimer, P. Castellano, G. J. Meyer. *Inorg. Chem.* 33, 5741 (1994); T. A. Heimer, S. T. D'Arcangelis, F. Farzad, J. M. Stipkala and G. J. Meyer *Inorg. Chem.* 35, 5319 (1996)). The films were then functionalized through adsorption of the following metal complexes on the surface of the nanocrystalline wide band gap semiconductor:

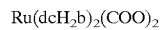

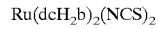

wherein dcH$_2$b is 2,2'-bipyridine-4,4'-dicarboxylic acid, and (trpy)(COOH)$_3$ is 4,4',4"-tricarboxy-2,2':6',2"-terpyridine. These species were prepared according to general methods reported in literature (M. K. Nazeeruddin, A. Kay, I. Rodicio, R. Humphry-Baker, E. Muller, P. Liska, N. Vlachopoulos, M. Gratzel *J. Am. Chem. Soc.* 115, 6382 (1993); R. Argazzi, C. A. Bignozzi, T. A. Heimer, P. Castellano, G. J. Meyer. *Inorg. Chem.* 33, 5741 (1994)).

Films with optical densities higher than 0.6 (normally in the range of about 1–2) were obtained through immersion of the transparent film in a $10^{-4}$ M methanol or ethanol solution of the dyes. The films were dried at 60° C., then immersed under a thin layer of acetonitrile and irradiated in the visible region with either a 150 W Xe lamp or with a Nd-YAG laser. The color changes observed upon irradiation are illustrated in FIGS. 1–4.

FIGS. 1–4 show the absorption spectra before and after irradiation of transparent films of metal oxides loaded with the following dye molecules, respectively:

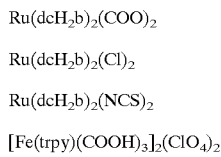

FIG. 5 illustrates the chromatic changes associated with the photoreactions of zirconium dioxide films with adsorbed $Ru(dcH_2b)_2(L)_2$ dyes (L is selected from $NCS^-$, $Cl^-$, and diethyldithiocarbamate) in the presence of acetonitrile. FIG. 6 illustrates chromatic changes associated with the photoreactions of zirconium dioxide films with adsorbed $[Fe(trpy)(COOH)_3](ClO_4)_2$ dyes in the presence of acetonitrile. The chromatic changes are due to the substitution reaction involving the $d\pi$-$\pi^*$($dcH_2b$) MLCT excited state of the complex and the acetonitrile solvent. The excited state reactivity of metal polypyridine complexes towards photosubstitution reaction in homogeneous solution has been previously described (for a review, see T. J. Meyer, Pure and applied Chemistry 58, 1193 (1986)). It is noted that such studies have not been extended to metal complexes adsorbed in the in heterogeneous phase on semiconductor materials or on amorphous silica. Neither have the literature proposed the use of such complexes in information recording media.

Figure 8A:
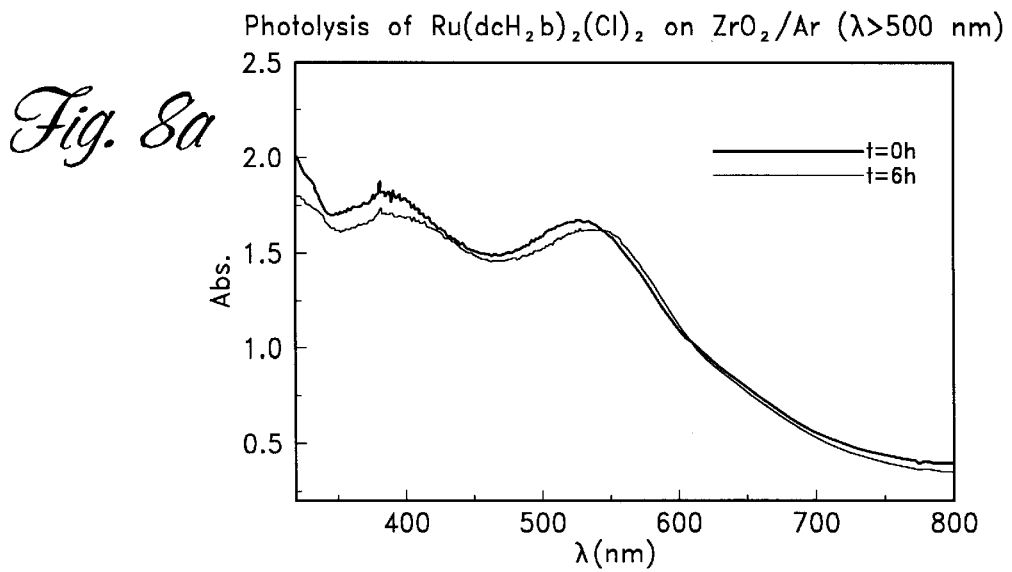
FIG. 8a shows the initial spectrum of Ru(dcH$_2$b)$_2$(Cl)$_2$ on ZrO$_2$/Ar, and the spectrum after photolysis at wavelengths greater than 500 nm for 6 hours.
Figure 8B:
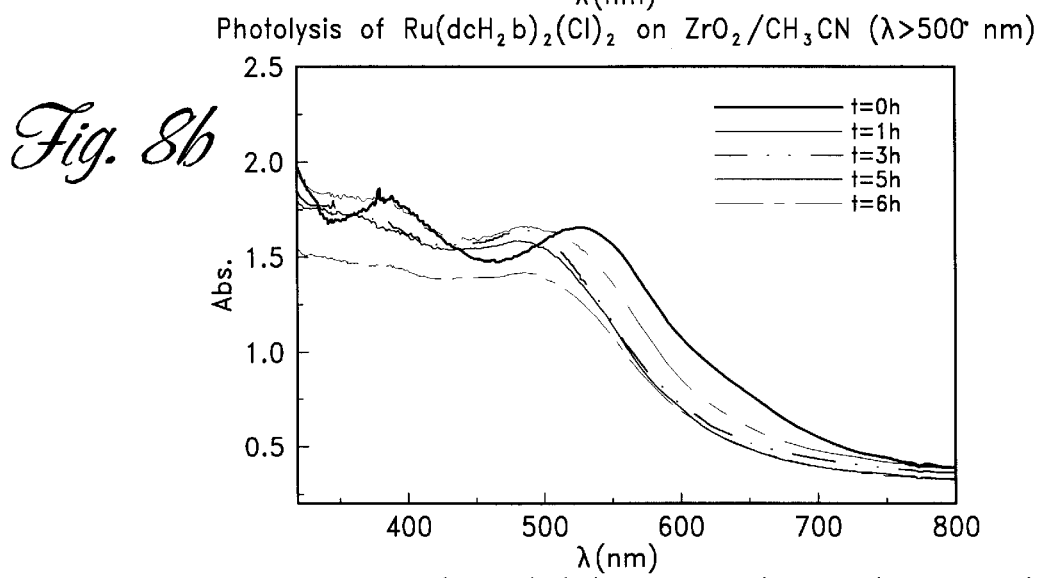
FIG. 8b shows the initial spectrum of Ru(dcH$_2$b)$_2$(Cl)$_2$ on ZrO$_2$/CH$_3$CN, and the spectrum after photolysis at wavelengths greater than 500 nm for 1, 2, 3, 5, and 6 hours.
Figure 8C:
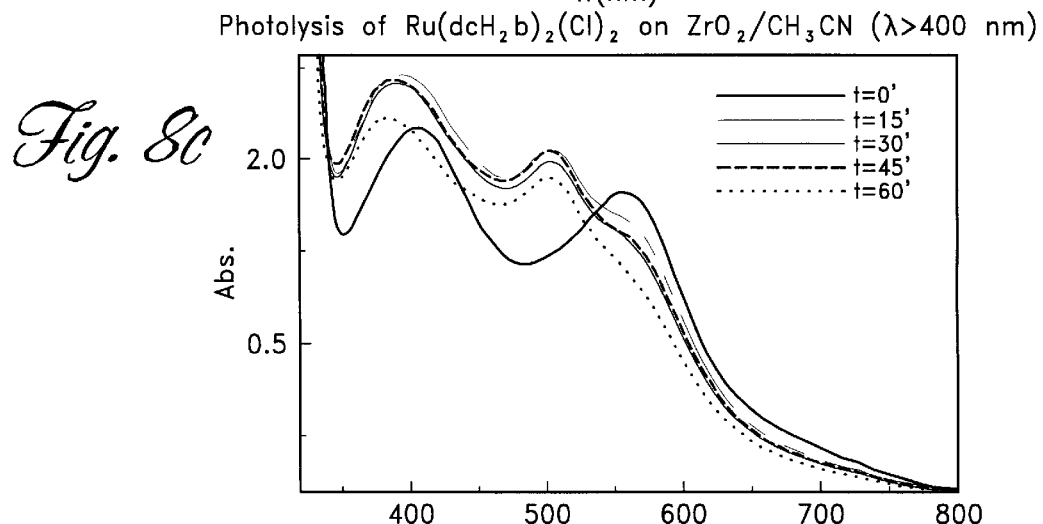
FIG. 8c shows the initial spectrum of Ru(dcH$_2$b)$_2$(Cl)$_2$ on ZrO$_2$/CH$_3$CN, and the spectrum after photolysis at wavelengths greater than 400 nm for 15, 30, 45, and 60 minutes.
Figure 9A:
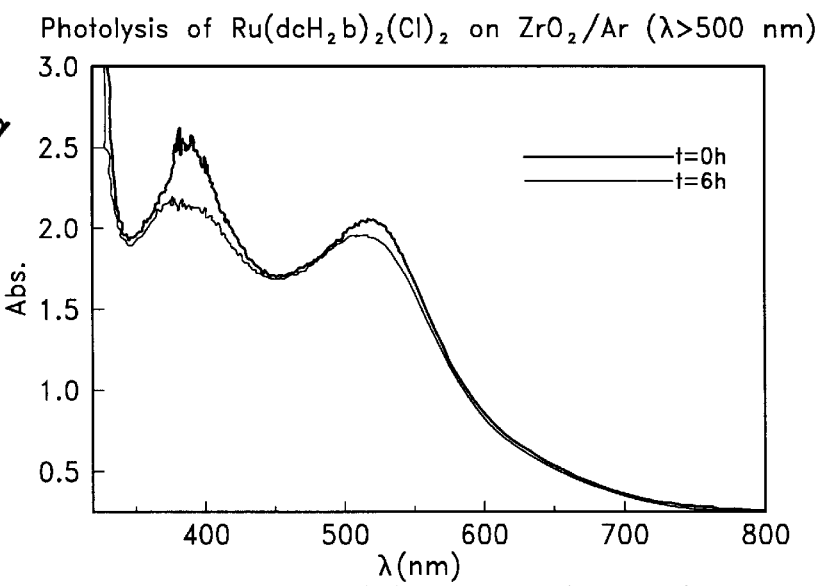
FIG. 9a shows the initial spectrum of Ru(dcH$_2$b)$_2$(NCS)$_2$ on ZrO$_2$/Ar, and the spectrum after photolysis at wavelengths greater than 500 nm for 6 hours.
Figure 9B:
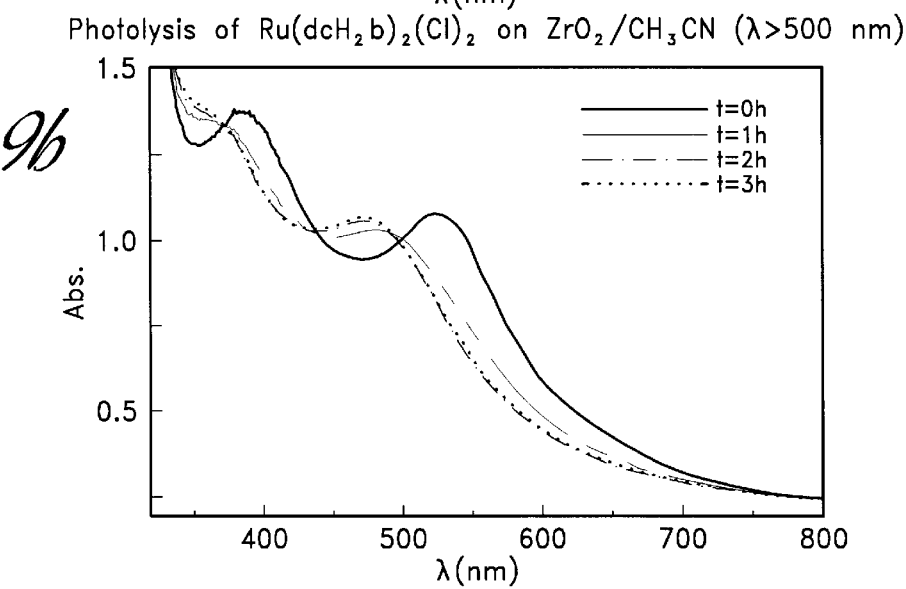
FIG. 9b shows the initial spectrum of Ru(dcH$_2$b)$_2$(NCS)$_2$ on ZrO$_2$/CH$_3$CN, and the spectrum after photolysis at wavelengths greater than 500 nm for 1, 2, and 3 hours.
Figure 9C:
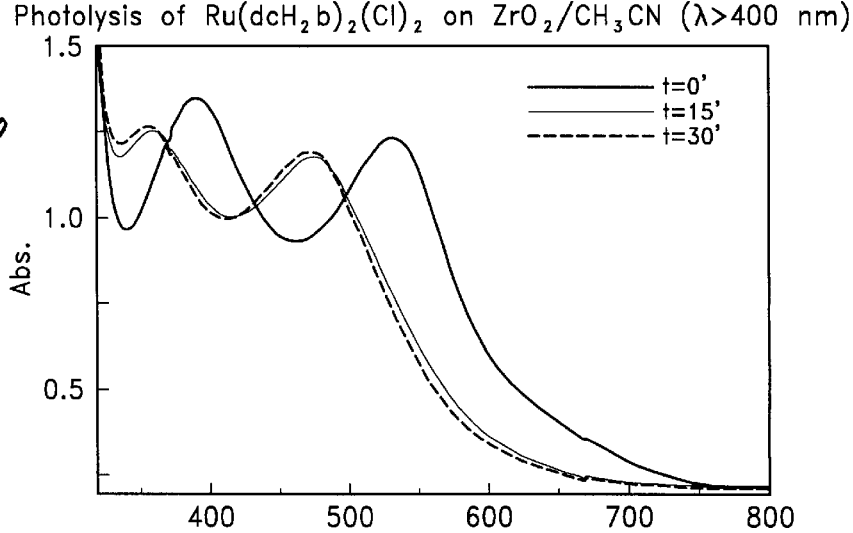
FIG. 9c shows the initial spectrum of Ru(dcH$_2$b)$_2$(NCS)$_2$ on ZrO$_2$/CH$_3$CN, and the spectrum after photolysis at wavelengths greater than 400 nm for 15 and 30 minutes.

Information which has been optically stored by irradiating the device with light of a wavelength shorter than 600 nm, preferably in the range 400–500 nm, may be read by using a beam of light with a wavelength longer than 550 nm. To store information in this way, the device needs to be protected from interaction with ambient humidity, which may cause the slow desorption of the dye or photosubstitution reactions involving water molecules. The protection may be realized by coating the optical device with a layer of a transparent polymeric film which is evaporated under a dried argon stream on its surface. The photochemical stability of the $Ru(dcH_2b)_2(COO)_2$, $Ru(dcH_2b)_2(Cl)_2$, and $Ru(dcH_2b)_2(NCS)_2$ metal complexes on transparent zirconium dioxide, under the full power of an unfiltered 150 W Xe lamp, are shown in FIGS. 7–9. In those experiments, the devices were maintained under a stream of dried argon. In FIGS. 7–9 are also reported, for comparison, the spectral changes observed as a function of time for the optical devices in the presence of acetonitrile.

Figure 10:
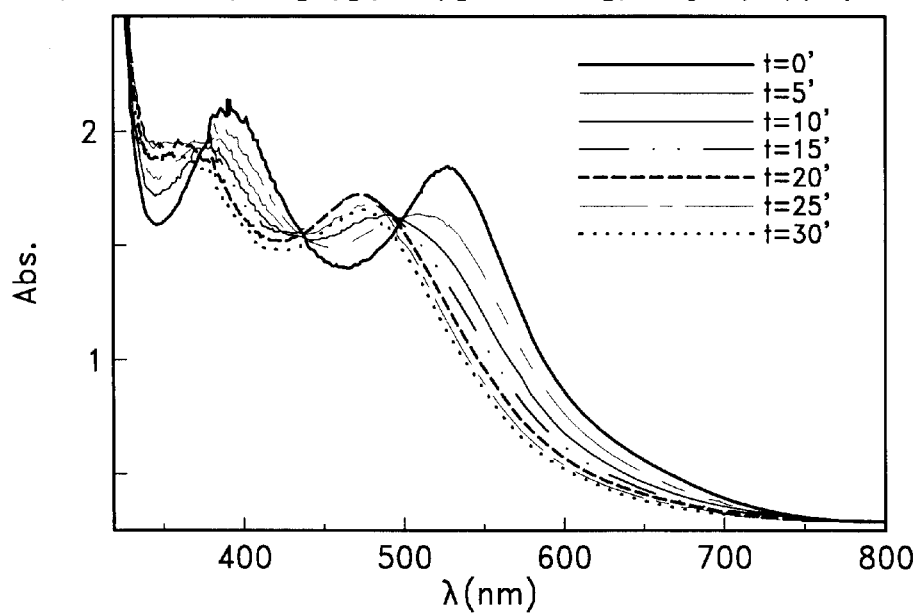
FIG. 10 shows the initial spectrum of Ru(dcH$_2$b)$_2$(NCS)$_2$ on ZrO$_2$/CH$_3$CN/bpy, and the spectrum after photolysis at wavelengths greater than 400 nm for 5, 10, 15, 20, 25, and 30 minutes.

In FIG. 10 are reported the spectral changes observed for irradiation of a $ZrO_2$ film on which is adsorbed the $Ru(dcH_2b)_2(NCS)_2$ complex, in the presence of the coordinating 2,2'-bipyridyl ligand (bpy), at a concentration of about 0.1 M. The spectral changes are consistent with the substitution of the $NCS^-$ ligands with bipyridine. Upon substitution of the $NCS^-$ ligands, the emission spectrum was observed to change. The initial emission spectrum, centered at 750 nm and characteristic of the $Ru(dcH_2b)_2(NCS)_2$ complex on $ZrO_2$, was replaced by a different emission spectrum centered at 660 nm and characteristic of the $[Ru(dcH_2b)_2(bpy)_2]^{2+}$ complex adsorbed on $ZrO_2$.

Type I Devices Utilizing The $[Ru(dcH_2b)_2(NCCH_3)_2]^{2+}$ Complex

Preparation of $[Ru(dcH_2b)_2(NCCH_3)_2]^{2+}$

The $[Ru(dcH_2b)_2(Cl)_2]$ complex is prepared according to published methods (M. K. Nazeeruddin, A. Kay, I. Rodicio, R. Humphry-Baker, E. Muller, P. Liska, N. Vlachopoulos, M. Gratzel J. Am. Chem. Soc. 115, 6382 (1993)). The $[Ru(dcH_2b)_2(NCCH_3)_2]^{2+}$ complex was prepared by dissolving $[Ru(dcH_2b)_2(Cl)_2]$ in methanol with a two fold molar excess of silver trifluoromethanesulfonate or silver hexafluorophosphate. The solution was refluxed for three hours, then the solution was rotary-evaporated to dryness. Acetonitrile was then added, the solution filtered, and then refluxed for an additional 8 hours. The solution was then concentrated and the acetonitrile complex precipitated by addition of diethylether. The complex was shown to be pure by chromatography on a silica gel column and by elemental analysis. The NMR spectrum of the complex was also obtained. 1H NMR : δ 9.52 d 1H×2, J 6Hz; 9.12 s 2H; 8.96 s 2H; 8.35 dd 2H, J 6Hz, J2 Hz; 7.8 d 2H, J 6Hz; 7.7 dd 2H, J 6Hz, J 2Hz.

Experimental Results

Transparent films based on nanocrystalline zirconium dioxide and titanium dioxide were prepared and deposited on glass as described above. These films were then functionalized through the adsorption of the $[Ru(dcH_2b)_2(NCCH_3)_2]^{2+}$ complex, wherein two molecules of acetonitrile bind the Ru(II) ion through the nitrogen end of cyanide. The adsorption was performed by immersing the film of zirconium dioxide or titanium dioxide in a $10^{-4}$ M acetonitrile solution of the complex for 8 hours at a temperature of 25–40° C. An alternative method of adsorption is from a methanol or acetone solution of the acetonitrile complex in the absence of light.

Figure 11A:
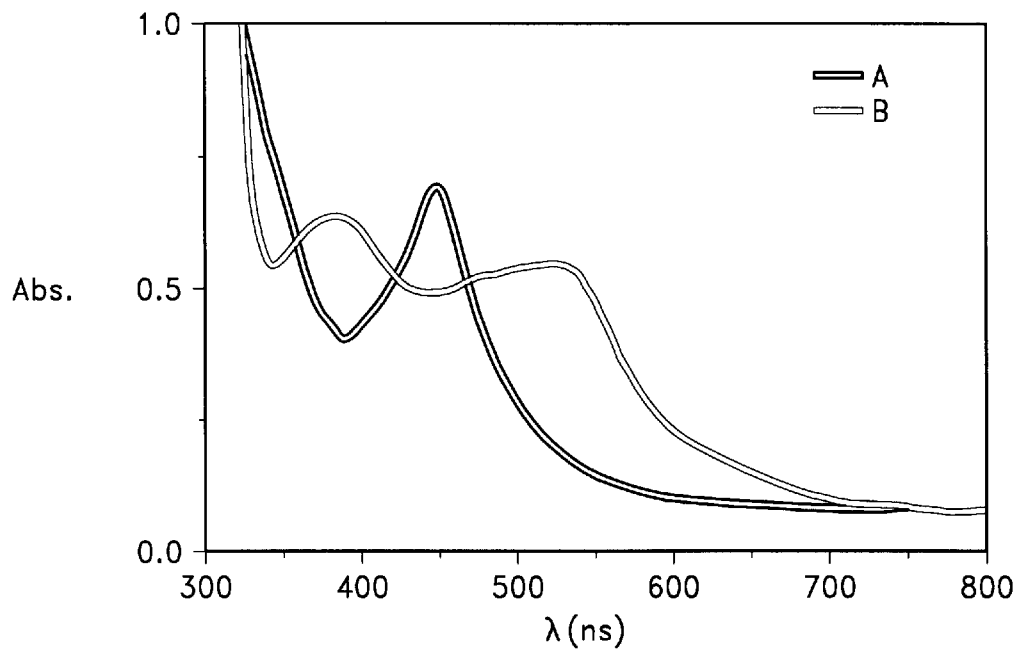
FIG. 11a shows the spectral change observed for [Ru(dcH$_2$b)$_2$(NCCH$_3$)$_2$]$^{2+}$ (Spectrum A) on a ZrO$_2$ film immersed in a methanol solution containing 0.1 M tetrabutylammonium chloride (TBACl) before and after irradiation of the film with an unfiltered 150 W Xe lamp.

FIG. 11a shows the spectral changes observed for $[Ru(dcH_2b)_2(NCCH_3)_2]^{2+}$ (Spectrum A) on a $ZrO_2$ film immersed in a methanol solution containing 0.1 M tetrabutylammonium chloride (TBACl). Irradiation of the film with an unfiltered 150 W Xe lamp caused a fast change from the initial spectrum (A) to the final spectrum (B). These spectral changes were consistent with photosubstitution of the coordinated acetonitrile with chloride. No further spectral changes were observed upon irradiating the dried film at wavelength longer than 550 nm.

Figure 11B:
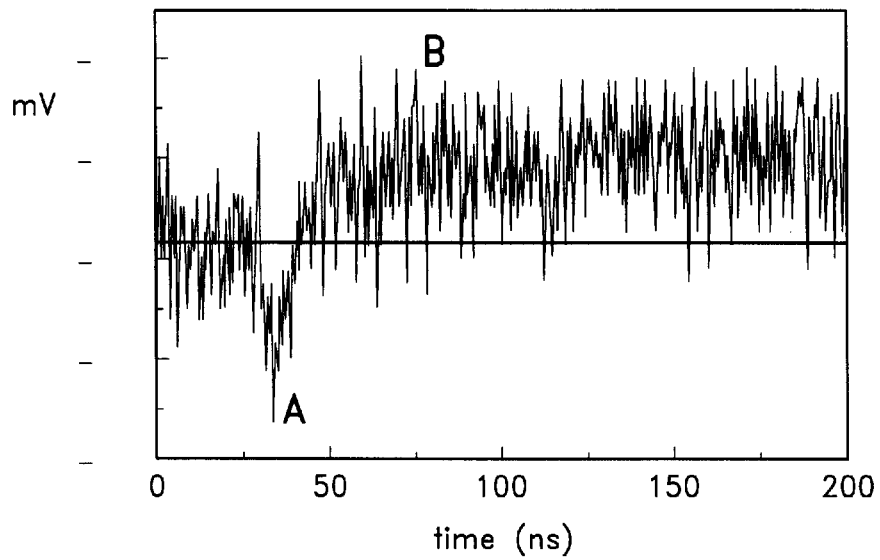
FIG. 11b shows the spectral change observed before and after laser excitation of the [Ru(dcH$_2$b)$_2$(NCCH$_3$)$_2$]$^{2+}$ complex in a methanolic solution containing 0.1M TBACl.

The time scale on which the photosubstitution reaction takes place was determined by laser flash photolysis experiments. A methanol solution of the $[Ru(dcH_2b)_2(NCCH_3)_2]^{2+}$ complex in the presence of 0.1 M TBACl was irradiated using an excitation beam of a ruby laser and a Nd-YAG laser. The beams were delivered in pulses of 2–5 mJ with a halfwidth of 5–7 ns. FIG. 11b shows that laser excitation of the $[Ru(dcH_2b)_2(NCCH_3)_2]^{2+}$ complex is followed by prompt appearance of an absorption peak centered at 550 nm as a result of substitution of $CH_3CN$ by chloride (the portion of the trace labeled B). The process is complete on a time scale of 50 ns.

Analogous behavior was observed for the complex in the presence of tetrabutylammonium NCS (TBANCS). $ZrO_2$ films with absorbed $[Ru(dcH_2b)_2(NCCH_3)_2]^{2+}$ complex in the presence of a solution of 0.1 M TBANCS in methanol were irradiated with a 150 W Xe lamp. The spectral changes observed are consistent with the formation of $[Ru(dcH_2b)_2(NCS)]^{2+}$. It should be noted in this case that the conversion of the. acetonitrile complex to the NCS-containing derivative is also accompanied by the appearance of an emission peak centered at 750 nm and by the appearance of strong infrared bands at 2100 cm$^{-1}$ due to the stretching mode of the coordinated NCS groups.

Type I Devices Utilizing The [Ru(4,4'-bpyCH$_2$PO$_3$H$_2$)$_2$(NCCH$_3$)$^2$]$^{2+}$ Complex

Preparation of [Ru(4,4'-bpyCH$_2$PO$_3$H$_2$)$_2$(NCCH$_3$)$_2$]$^{2+}$

Ligand Preparation
4,4'-Diethoxycarbonyl-2,2'-bipyridine (1)

To a suspension of 4,4'-dicarboxy-2,2'-bipyridine (5.0 g, 20.5 mmol) in 400 mL of absolute ethanol, 5 mL of conc. sulfuric acid was added. The mixture was refluxed for 80 hours to obtain a clear solution, which was cooled to room temperature. 400 mL water was added and the excess ethanol removed under vacuum. The pH was adjusted to neutral with NaOH and the resulting precipitate filtered and washed with water (pH=7). The solid was dried to obtain 5.5 g (90%) of (1). $^1$H NMR (300 MHz, CDCl$_3$) δ ppm: 1.45 (6H, t, 2CH$_2$CH$_3$), 4.48 (4H, q, 2CH$_2$CH$_3$), 7.98 (2H, dd, aryl H on C$^5$ and C$^{5'}$), 8.88 (2H, d, aryl H on C$^6$ and C$^{6'}$), 9.00 (2H, s, aryl H on C$^3$ and C$^{3'}$). Elemental analysis of C$_{16}$H$_{16}$N$_2$O$_4$: calcd. C 63.98, H 5.37, N 9.33%, found C 63.43, H 5.71, N 9.57%.

4,4'-Bis(hydroxymethyl)-2,2'-bipyridine (2)

To a suspension of the diester (1) (3.0 g, 10.0 mmol) in 200 mL of absolute ethanol, 8.2 g of sodium borohydride was added in one portion. The mixture was refluxed for 3 hours, cooled to room temperature, then 200 mL of a saturated aqueous solution of ammonium chloride was added to decompose the excess borohydride. The ethanol was removed and the precipitated solid was dissolved with a minimum amount of water. The resulting solution was extracted with ethyl acetate (5×200 mL) then dried over sodium sulfate and rotary-evaporated. The 1.7 g (80% yield) of solid (2) thus obtained was used without further purification. $^1$H NMR (300 MHz, CD$_3$OD) δ ppm: 4.75 (4H, s, 2CH$_2$OH), 7.43 (2H, d, $^3$J$_{HH}$=6 Hz, aryl H on C$^5$ and C$^{5'}$), 8.25 (2H, s, aryl H on C$^3$ and C$^{3'}$), 9.00 (2H, d, $^3$J$_{HH}$=6 Hz, aryl H on C$^6$ and C$^{6'}$). Elemental analysis of C$_{12}$H$_{12}$N$_2$O$_2$: calcd. C 66.65, H 5.59, N 12.95%, found C 65.90, H 5.70, N 12.32%.

4,4'-Bis(bromomethyl)-2,2'-bipyridine (3)

A solution of 2 (0,9 g, 4.2 mmol) was dissolved in a mixture of 48% HBr (20 mL) and conc. sulfuric acid (6.7 mL). The resulting solution was refluxed for 6 hours then allowed to cool to room temperature and 40 mL of water was added. The pH was adjusted to neutral with NaOH and the resulting precipitate filtered, washed with water, and air dried. The solid was dissolved in chloroform (40 mL) and filtered. The solution was dried over magnesium sulfate and evaporated, yielding 1.2 g (85% yield) of (3) as a white powder. $^1$H NMR (300 MHz, CDCl$_3$) δ ppm: 4.50 (4H, s, 2 CH$_2$), 7.38 (2H, dd, $^3$J$_{HH}$=5 Hz, aryl H on C$^5$ and C$^{5'}$), 8.45 (2H, d, aryl H on C$^3$ and C$^{3'}$), 8.68 (2H, d, $^3$J$_{HH}$=5 Hz, aryl H on C$^6$ and C$^{6'}$). Elemental analysis of C$_{12}$H$_{10}$N$_2$Br$_2$: calcd. C 42.14, H 2.95, N 8.19%, found C 42.03, H 3.09, N 8.38%.

4,4'-Bis(diethylmethylphosphonate)-2,2'-bipyridine (4)

A chloroform (10 mL) solution of (3) (1.5 g, 4.4 mmol) and 15 mL of triethylphosphite was refluxed for 3 hours under nitrogen. The excess phosphite was removed under high vacuum, then the crude product was purified by column chromatography on silica gel (eluent ethyl acetate/methanol 80/20) yielding 1.6 g (80%) of (4). $^1$H NMR (300 MHz, CDCl$_3$) δ ppm: 1.29(12H, t, $^3$J$_{HH}$=7 Hz, 4 POCH$_2$CH3), 3.23 (4H, d, $^2$J$_{PCH}$=22 Hz, 2CH$_2$P), 4.09 (8H, dq, $^3$J$_{POCH}$=7 Hz, 3J$_{HH}$=7 Hz, 4 POCH$_2$CH$_3$), 7.35–7.38 (2H, m, aryl H on C$^5$ and C$^{5'}$), 8.34–8.37 (2H, m, aryl H on C$^3$ and C$^{3'}$), 8.62 (2H, d, $^3$J$_{HH}$=5 Hz, aryl H on C$^6$ and C$^{6'}$). $^{31}$P NMR (CDCl$_3$) δ ppm: 25.37. Elemental analysis C$_{20}$H$_{30}$N$_2$O$_6$P$_2$: calcd. C 52.63, H 6.63, N 6.14%, found C 52.83, H 6.59, N 6.01%.

2.2'-Bipyridyl 4,4'-dimethyl-bisphosphonic acid (5)

Ester (4) (100 mg, 0.22 mmol) was heated at reflux with an 18% solution of HCl (2 mL) for 7 hours. The aqueous acid was rotary-evaporated to yield 60 mg of the desired acid (5) (80% yield). $^1$H NMR (300 MHz, D$_2$O pH=7) δ ppm: 2.95 (4H, d, $^2$J$_{PCH}$=22 Hz, 2 CH$_2$P), 7.35 (2H, d, aryl H on C$^5$ and C$^{5'}$), 7.85 (2H, s, aryl H on C$^3$ C$^{3'}$), 8.42 (2H, d, aryl H on C$^6$ and C$^{6'}$). $^{31}$P NMR (D$_2$O pH=7) δ ppm: 17.35.

Preparation of Complex [Ru[(4,4'-(C$_2$H$_5$)$_2$PO$_3$CH$_2$)$_2$bpy)$_2$Ru(NCCH$_3$)$_2$]$^{2+}$ (6)

To a DMF (35 mL) solution of RuCl$_3$.3 H$_2$O (80 mg, 0.38 mmol) and lithium chloride (1600 mg, 38 mmol), was added a DMF (5 mL) solution of (5) (312 mg, 0,68 mmol) under argon. The solution was heated at 120° C. for 8 hours, then the solvent was removed under vacuum. The crude product was purified by column chromatography on silica gel using methanol as eluent and yielding 124 mg (30%) of (6). Absorption spectrum of the complex in methanol: λ$_{max}$ 359 nm and 514 nm.

[Ru((H$_2$PO$_3$CH$_2$)$_2$bpy)$_2$(NCCH$_3$)$_2$]$^{2+}$

Complex (6) was hydrolyzed in hydrochloric acid. The corresponding acetonitrile complex was prepared following the same procedure as reported above for [Ru(dcH$_2$b)$_2$(NCCH$_3$)$_2$]$^{2+}$. The absorption spectrum in the visible region of the [Ru((H$_2$PO$_3$CH$_2$)$_2$bpy)$_2$(NCCH$_3$)$_2$]$^{2+}$ complex is dominated by an MLCT band with maximum at 454 nm.

Experimental Results

The photosubstitution behavior of the acetonitrile complex was further confirmed by experiments performed with the analogous species containing the chromophoric 4,4'-bpyCH$_2$PO$_3$H$_2$ ligand instead of dcH$_2$b, [Ru(4,4'-bpyCH$_2$PO$_3$H$_2$)$_2$(NCCH$_3$)$_2$]$^{2+}$. These experiments performed on transparent films of TiO$_2$ or ZrO$_2$, showed an analogous photo-reactivity towards photo-substitution reaction with Cl$^-$ or NCS$^-$ ions and indicated the stability of the deposit of [Ru(4,4'-bpyCH$_2$PO$_3$H$_2$)$_2$(NCCH$_3$)$_2$]$^{2+}$, even in the presence of non anhydrous organic solvents. This fact is due to the strong affinity of the phosphonate functional groups for binding metal oxides, silica, alumina and, more in general, solid substrates with surface OH groups.

Type II Devices Utilizing ([HOOCpyRu$^{II}$(NH$_3$)$_4$—NC-nor-CN— Ru$^{II}$(NH$_3$)$_4$pyCOOH])$^{4+}$

Preparation of ([HOOCpyRu$^{II}$(NH$_3$)$_4$—NC-nor-CN— Ru$^{II}$(NH$_3$)$_4$pyCOOH])$^{4+}$ HOOCpyRu$^{III}$(NH$_3$)$_4$(SO$_4$) was prepared according to methods published in the literature (C. A. Bignozzi, C. Paradisi, S. Roffia, F. Scandola. *Inorg. Chem.*, 27, 408 (1988)). A 200 mg amount of this complex was dissolved in 200 ml of 10$^{-3}$ M HCl at room temperature. The solution was kept under argon atmosphere and the complex was reduced over a zinc amalgam. After 1 h, the solution was transferred to a second reactor containing 33.5 mg of NC-nor-CN and stirred under argon for 5 additional hours. The complex was precipitated by addition of solid NH$_4$PF$_6$, filtered, and washed with diethyl ether.

Experimental Results

A 10$^{-4}$ M solution of the binuclear complex ([HOOCpyRu$^{II}$(NH$_3$)$_4$—NC-nor-CN—Ru$^{II}$(NH$_3$)

₄pyCOOH])⁴⁺ in a 95% methanol/5% polyvinylpyridine-styrene polymer solution (wherein the polyvinylpyridine-styrene polymer contained 10% styrene) was prepared. A polymeric solid comprising the metal complex and the polyvinylpyridinestyrene polymer was deposited from solution onto transparent glass and air dried. The red transparent polymeric solid was then exposed to light irradiation in the visible region by using the full power of a 150 W Xe lamp with cut-off at 540 nm. The solid was then irradiated in the UV region with the unfiltered Xe lamp. The spectral changes observed in the methanolic solution of the complex are reported in FIG. 12. In FIG. 13 are reported the spectral changes observed for the complex adsorbed in the solid polymeric film.

Figure 12:
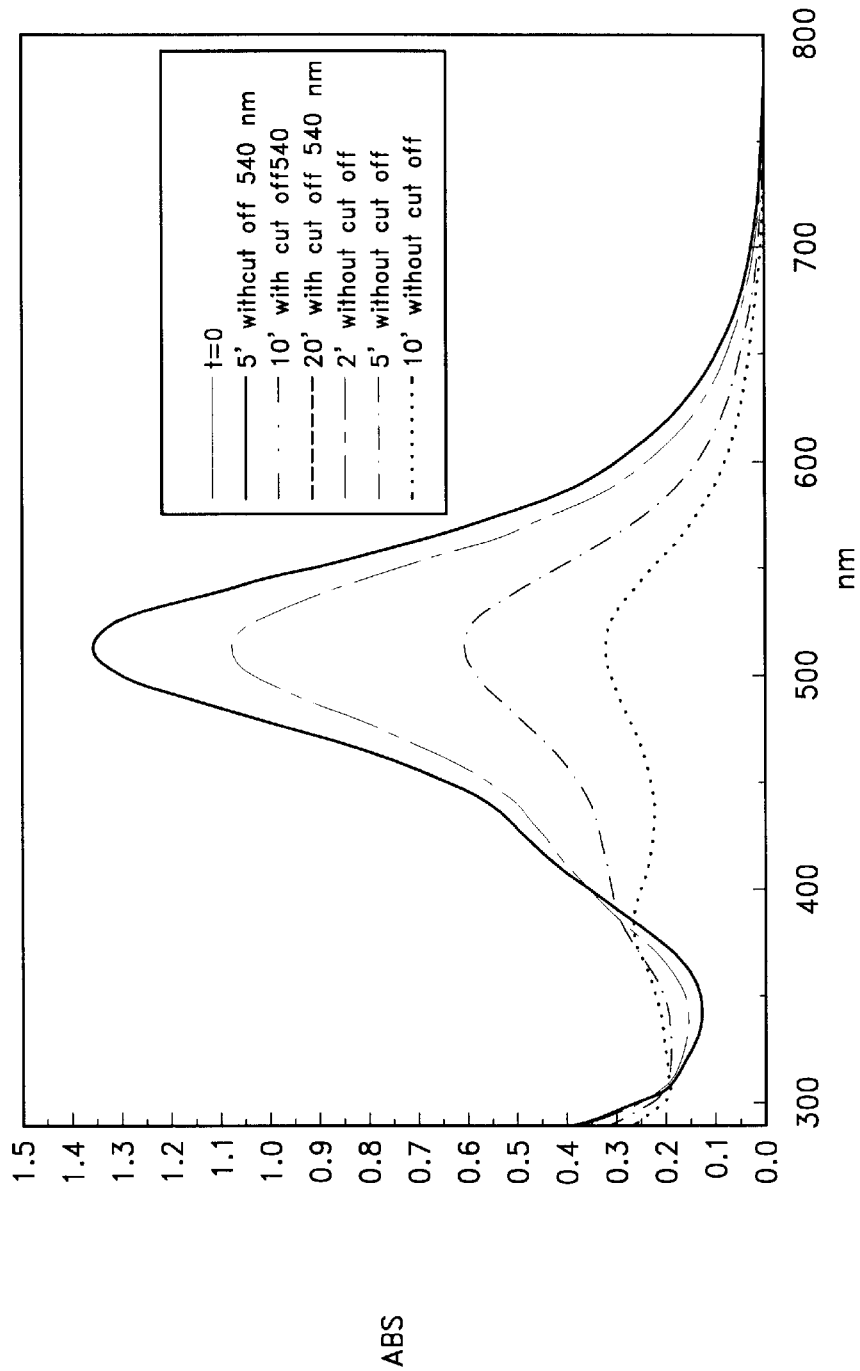
FIG. 12 shows the initial spectrum of [HOOCpyRu$^{II}$(NH$_3$)$_4$—NC-nor-CN—Ru$^{II}$(NH$_3$)$_4$pyCOOH])$^{4+}$ in a methanol solution, and spectra after photolysis with a 150 Watt Xe lamp for 5, 10, and 20 minutes with a wavelength cut-off of 540 nm, and the spectra after photolysis for 2, 5, and 10 minutes without a wavelength cutoff.
Figure 13:
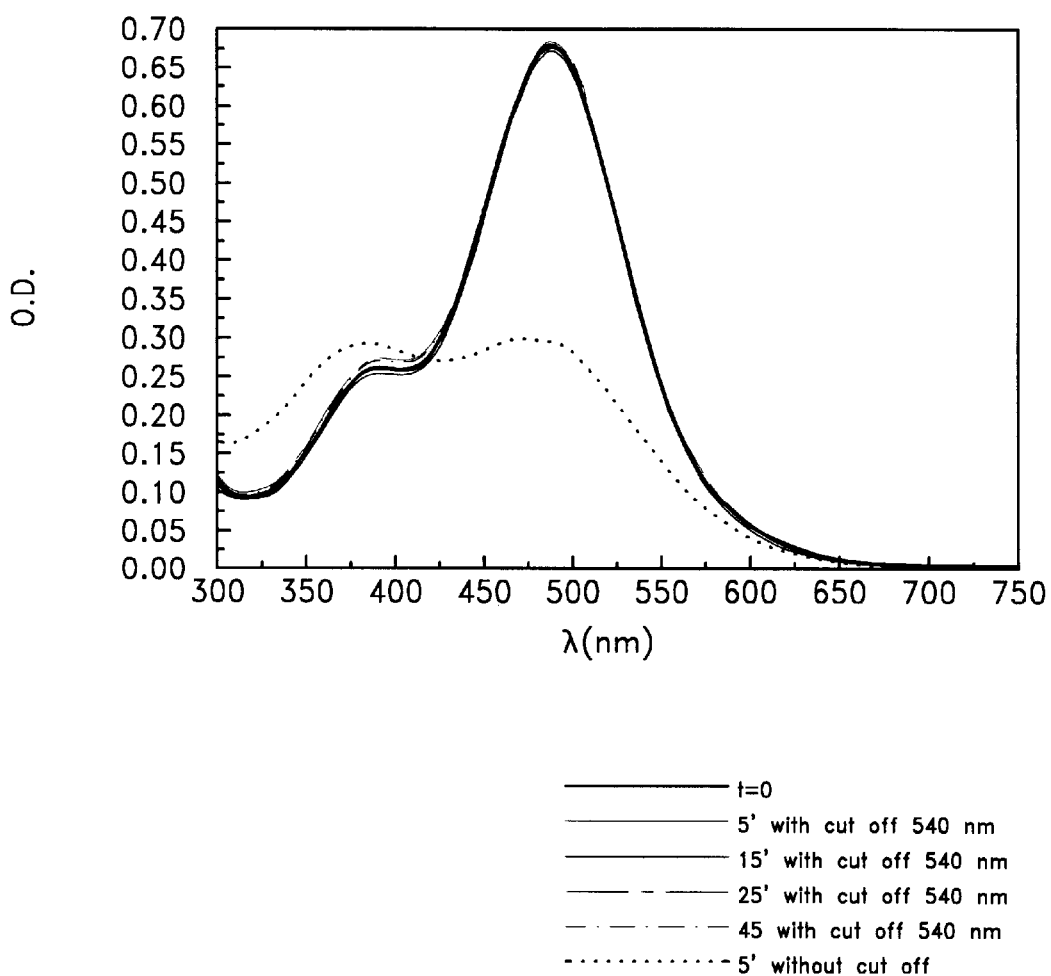
FIG. 13 shows the initial absorption spectrum of [HOOCpyRu$^{II}$(NH$_3$)$_4$—NC-nor-CN—Ru$^{II}$(NH$_3$)$_4$pyCOOH])$^{4+}$ dispersed in a transparent solid polymer matrix of 4-polyvinyl pyridine/10% styrene, the absorption spectra after 5, 15, 25 and 45 min of irradiation with wavelength cut-off of 540 nm, and the absorption spectrum after 5 min of irradiation without wavelength cut-off.

From FIGS. 12 and 13, it can be seen that while visible irradiation in the charge transfer band associated with the d-π* (Ru$^{II}$-nor) MLCT transition does not produce any color change, irradiation in the UV region does. This implies that population of π-π* norbomadiene states produces a remarkable bleach of the visible absorption band, consistent with the norbomadiene to quadricyclene isomerization.

The system is unusual in that it shows two π-π* and MLCT states, only one of which (the upper lying π-π*state) is photoreactive towards electronic isomerization. This is probably a consequence of an ultrafast electronic isomerization from norbornadiene to quadricyclene which competes with the relaxation of the π-π* state to the lower lying MLCT excited state.

Information can thus be recorded at the molecular level by irradiating this type of film in the UV region. Reading of information can be performed in transmission mode by using light of wavelength longer than 540 nm, at which no photoisomerization of the norbomadiene moiety can take place.

Figure 14:
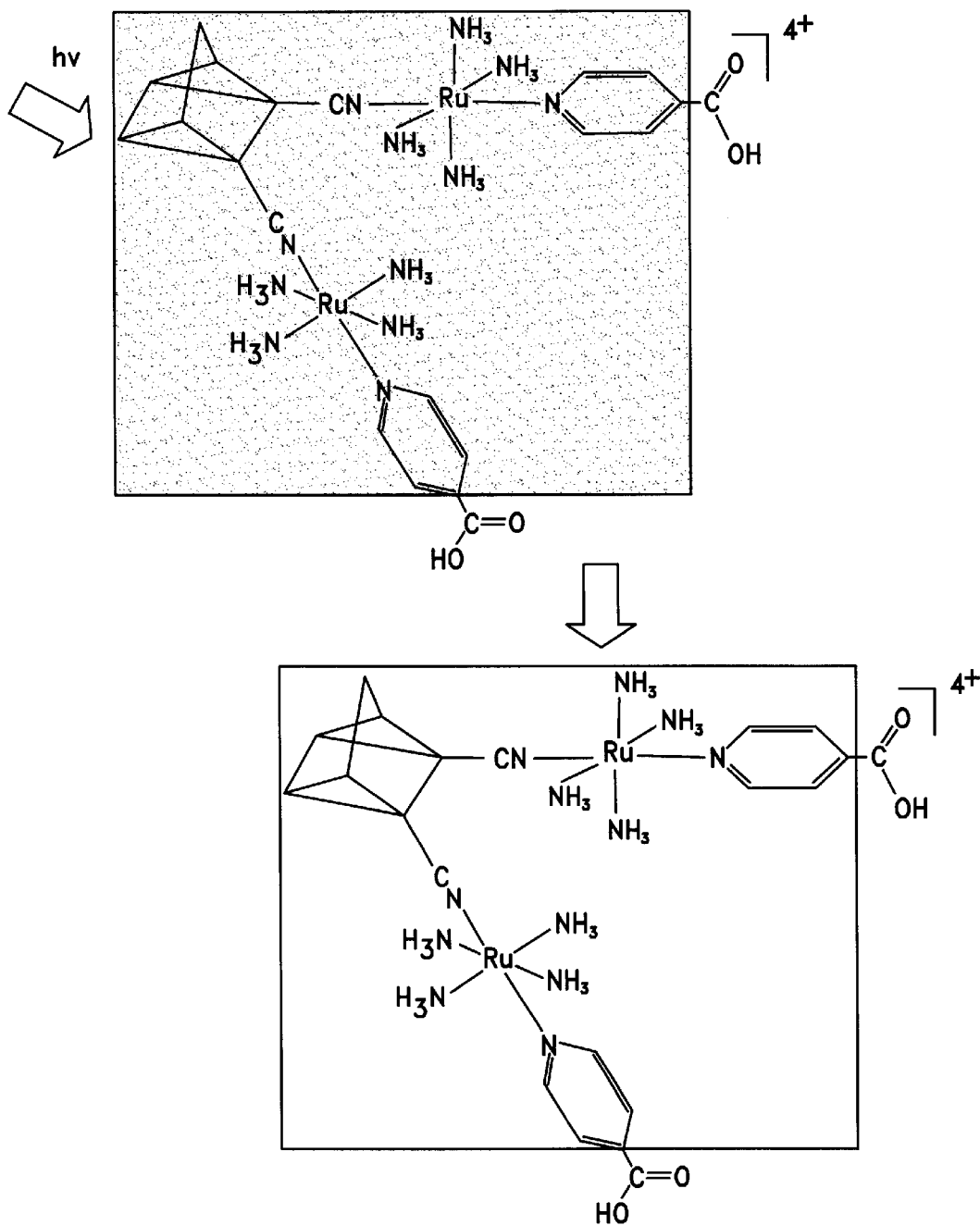
FIG. 14 generally illustrates the functioning of a Type II device, wherein norbornadiene is isomerized to quadricyclene.

FIG. 14 generally illustrates the functioning of a Type II device, wherein the norbornadiene moiety isomerizes to the quadricyclene moiety.

Type III Devices Utilizing [(4.4'-bpy(COOH)₂Ru(CN)₄]²⁻ and [((H₂PO₃CH₂)₂bpy)Ru(CN)₄]²⁻

Preparation of [(4,4'-bpy(COOH)₂)Ru(CN)₄]²⁻

[Ru(CN)₆](TBA)₃ and a stoichiometric amount of 4,4'-bpy(COOH)₂ were dissolved in dimethylformamide (DMF) and refluxed for 2 hours. The reaction mixture was purified by size exclusion chromatography on LH20 by eluting with DMF. The red-violet fraction containing the desired complex was collected and rotary-evaporated to dryness.

Preparation of [((H₂PO₃CH₂)₂bpy)Ru(CN)₄]²⁻

The same method as described above was used, except that a stoichiometric amount of (H₂PO₃CH₂)₂bpy was substituted for 4,4'-bpy(COOH)₂.

Experimental Results

The two complexes show marked solvatochromic behavior and exhibit IR spectra analogous to those reported for the [(bpy)Ru(CN)₄]⁴⁻ complex ion (C. J. Timpson, C. A. Bignozzi, B. P. Sullivan, E. D. Kober, T. J. Meyer *J. Phys. Chem.* 100, 2915 (1996)). The (TBA)₂[Ru(dcb)₂(CN)₄] complex salt in methanol solution shows MLCT absorption bands with maxima at 355 and 465 nm. The complex in methanol solution is also emitting, with an emission maximum at 690 nm and a lifetime of 73 ns.

FIG. 15 generally illustrates the functioning of a Type III device, wherein a molecular sensitizer and electron acceptor are adsorbed on a titanium dioxide substrate.

Figure 16:
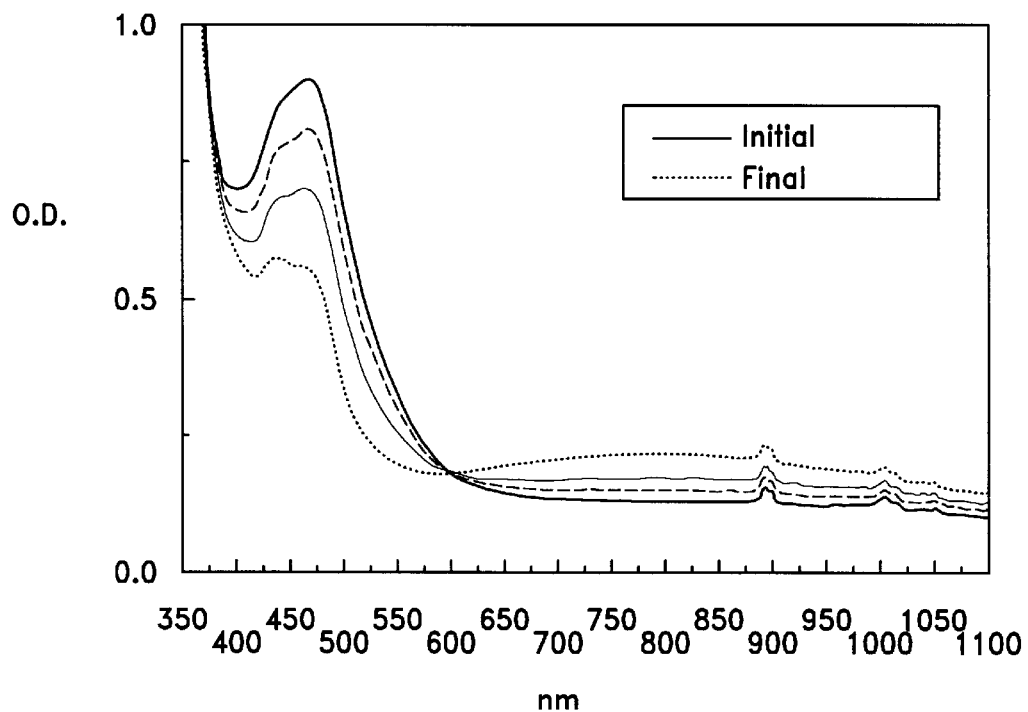
FIG. 16 shows the initial spectrum of [Ru(dcbH$_2$)$_2$(bpy)]2+ and of the binuclear K[trans-HOOCpyRu$^{III}$(NH$_3$)$_4$—NCRu$^{II}$(CN)$_5$] complex adsorbed on a transparent titanium dioxide film, and the spectra after 5, 10 and 20 seconds of photolysis with a 150W Xe lamp.

In FIG. 16 are reported the spectral changes observed for a transparent titanium dioxide film with adsorbed Ru(dcb)₂(bpy) (acting as (S)) and the binuclear K[trans-HOOCpyRu$^{III}$(NH₃)₄—NCRu$^{II}$(CN)₅] complex (acting as (Q)) irradiated with a 150W Xe lamp. The absorption on TiO₂ was carried out from a 2×10⁻⁴ M solution of the two species in methanol. The final spectral characteristics are maintained under continuous irradiation. The initial spectrum is reestablished in the dark or in shadow. Analogous behavior was observed for [4,4'-bpy(COOH)₂Ru(CN)₄]²⁻, [4,4'-(H₂PO₃CH₂)₂bpyRu(CN)₄], and [4,4'-bpy(COOH)₂Re(CO)₃], wherein L is Cl⁻, CN⁻, or pyridine. Although it is preferred that the substituents be bound in the 4,4' position so as to maximize the dipole moment, other positions, e.g., 3,3' and 5,5' are also acceptable.

The above description and examples disclose several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A binary data recording medium, comprising:
   a substrate;
   a recording layer on the substrate, the recording layer comprising an organometallic transition metal complex, the transition metal complex absorbing light having a first wavelength;
   wherein the transition metal complex has a light-induced excited state, the excited state resulting in a reaction product in the recording layer which absorbs light having a second wavelength, the first and second wavelengths being different and where light absorption of the first wavelength is assigned a first value, and light absorption of the second wavelength is assigned a second value, the first and second values corresponding to binary code.

2. The binary data recording medium of claim 1, wherein the transition metal complex comprises at least one of the following formulas:

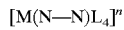

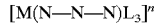

and

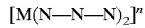

wherein M is a transition metal;
N—N is a chromophoric polypyridine ligand incorporating from one to two substituents selected from the group consisting of —COOH, —B(OH)₂, —PO₃H₂, and —R—PO₃H₂, wherein R is a saturated or aromatic hydrocarbon group;
N—N—N is a chromophoric terpyridyl ligand incorporating from one to three substituents selected from the group consisting of —COOH, —B(OH)₂, —PO₃H₂, —R—PO₃H₂, and phenyl, wherein the phenyl incorporates one or more substituents selected from the group consisting of —COOH, —B(OH)₂, —PO₃H₂, —R—PO$_3$H$_2$, wherein R is a saturated or aromatic hydrocarbon group; and L is a nonchromophoric monodentate or polydentate ancillary ligand.

3. The binary data recording medium of claim 2, wherein M is selected from the group consisting of cobalt, nickel, copper, iridium, palladium, platinum, rhenium, osmium, iron, ruthenium and rhodium.

4. The binary data recording medium of claim 2, wherein N—N is selected from the group consisting of substituted and unsubstituted 2,2'-bipyridyl, substituted and unsubstituted 1,10-phenanthroline and substituted or unsubstituted 2,2'-biquinoline.

5. The binary data recording medium of claim 2, wherein N—N—N is substituted by a phenyl, and wherein the phenyl incorporates a substituent in a para position.

6. The binary data recording medium of claim 2, wherein L is selected from the group consisting of NC—(CH$_2$)$_2$—CN, NC—(CH$_2$)$_3$—CN, NC—(CH$_2$)$_4$—CN, halide, NCS$^-$, N$_3^-$, —CH$_3^-$, H$^-$, oxalate, CO, CN$^-$, NO, H$_2$O, OH$^-$, NH$_3$, triazole, pyridine, pyrazine, 4,4'-bipyridine, 4,4'-bipyridylethane, 4,4'-bipyridylethylene, 4-cyanopyridine, dicyanobenzene, diethylenediamine, NO$_2^-$, and acetylacetone.

7. The binary data recording medium of claim 2, wherein L comprises a coordinating solvent selected from the group consisting of acetylacetone, methanol, acetonitrile, acetone, tetrahydrofuran, ethanol, dimethylformamide, and dimethylsulfoxide.

8. The binary data recording medium of claim 1, wherein said substrate is selected from the group consisting of amorphous, nanocrystalline and semiconductors.

9. The binary data recording medium of claim 1, wherein the transition metal complex comprises at least one of the following formulas:

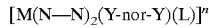

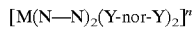

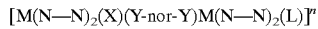

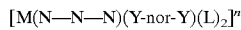

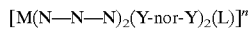

and

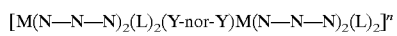

wherein Y is selected from the group consisting of cyano, pyridine, and pyridine methylene and nor is norbornadiene;

M is a transition metal;

N—N is a substituted or unsubstituted chromophoric polypyridine ligand;

N—N—N is a substituted or unsubstituted chromophoric terpyridyl ligand;

L is a nonchromophoric monodentate or polydentate ancillary ligand; and

X is a ligand selected from the group consisting of polyaza macrocyclic group and polythio macrocyclic group.

10. The binary data recording medium of claim 1, wherein the transition metal complex is represented by at least one of the following formulas:

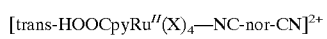

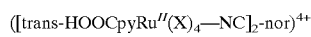

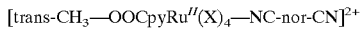

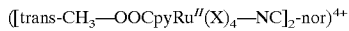

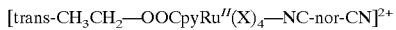

and

wherein HOOCpy is the isonicotinic acid; NC-nor-CN is the dicyanonorbornadiene ligand; X is selected from the group consisting of polyaza macrocyclic group, polythio macrocyclic group, and NH$_3$; and trans is the configuration of the Ru center.

11. The binary data recording medium of claim 1, wherein the substrate is a semiconductor and the transition metal complex comprises a molecular sensitizer represented by at least one of the following formulas:

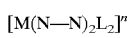

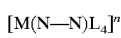

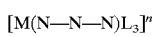

and

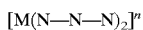

wherein M is a transition metal;

N—N is a chromophoric polypyridine ligand and incorporating from one to two substituents selected from the group consisting of —COOH, —B(OH)$_2$, —PO$_3$H$_2$, and —R—PO$_3$H$_2$, wherein R is a saturated or aromatic hydrocarbon group;

N—N—N is a chromophoric terpyridyl ligand incorporating from one to three substituents selected from the group consisting of —COOH, —B(OH)$_2$, —PO$_3$H$_2$, —R—PO$_3$H$_2$, and phenyl, wherein the phenyl incorporates one or more substituents selected from the group consisting of —COOH, —B(OH)$_2$, —PO$_3$H$_2$, —R—PO$_3$H$_2$, wherein R is a saturated or aromatic hydrocarbon group;

L is a nonchromophoric monodentate or polydentate ancillary ligand; and wherein the molecular sensitizer has a photoabsorption spectrum and is capable of injecting an electron into an empty conduction band of the substrate upon absorption of visible light to form oxidized molecular sensitizer having a photoabsorption spectrum different from the unoxidized molecular sensitizer, wherein an electron acceptor is present which has a photoabsorption spectrum and is capable of accepting the electron to form a reduced electron acceptor having a different photoabsorption spectrum, and wherein a separation of charge between the oxidized molecular sensitizer and reduced electron acceptor is maintained upon continued irradiation by visible light.

12. The binary data recording medium of claim 11, wherein said substrate is selected from the group consisting of tungsten trioxide, titanium dioxide, zinc dioxide, and tin dioxide.

13. The binary data recording medium of claim 11, wherein said substrate is nanocrystalline.

14. The binary data recording medium of claim 11, wherein the semiconductor substrate comprises particles in colloidal form.

15. The binary data recording medium of claim 11, wherein the particles have an average diameter ranging from about 10 nm to about 50 nm.

16. The binary data recording medium of claim 11, wherein said electron acceptor is represented by one of the formulas:

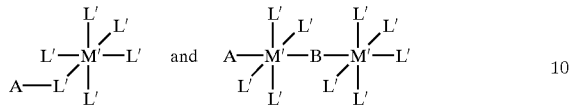

wherein A is pyridine substituted in the para position by a moiety selected from the group consisting of —COOH, —B(OH)$_2$, PO$_3$H$_2$, and —R—PO$_3$H$_2$, wherein R is a hydrocarbon linking group;

B is a bridging ligand;

L', which can be the same or different, is a ligand selected from the group consisting of NC—(CH$_2$)$_2$—CN, NC—(CH$_2$)$_3$—CN, NC—(CH$_2$)$_4$—CN, halide, NCS$^-$, oxalate, CO, CN$^-$, NO, pyridine, 4-cyanopyridine, dicyanobenzene, H$_2$O, OH$^-$, NH$_3$, diethylenediamine, NO$_2^-$, 2,2'-bipyridyl unsubstituted or substituted by one or more methyl groups, and 1,10-phenanthroline unsubstituted or substituted by one or more methyl groups; and M', which can be the same or different, is a transition metal capable of undergoing a reversible change of oxidation state.

17. The binary data recording medium of claim 11, additionally comprising a thin transparent polymeric film, wherein said film is situated atop the recording layer.

* * * * *